US011633802B2

(12) United States Patent
Okada et al.

(10) Patent No.: US 11,633,802 B2
(45) Date of Patent: Apr. 25, 2023

(54) METHOD FOR OPERATING DOUBLE-ACTION FRICTION STIR WELDING DEVICE, AND DOUBLE-ACTION FRICTION STIR WELDING DEVICE

(71) Applicant: KAWASAKI JUKOGYO KABUSHIKI KAISHA, Kobe (JP)

(72) Inventors: Hideki Okada, Kakamigahara (JP); Syuhei Yoshikawa, Kobe (JP); Masahiro Miyake, Kobe (JP); Masahiro Takagi, Kakamigahara (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 533 days.

(21) Appl. No.: 16/644,356

(22) PCT Filed: Sep. 3, 2018

(86) PCT No.: PCT/JP2018/032639
§ 371 (c)(1),
(2) Date: Mar. 4, 2020

(87) PCT Pub. No.: WO2019/045102
PCT Pub. Date: Mar. 7, 2019

(65) Prior Publication Data
US 2021/0086291 A1 Mar. 25, 2021

(30) Foreign Application Priority Data
Sep. 4, 2017 (JP) .............................. JP2017-169884

(51) Int. Cl.
*B23K 20/00* (2006.01)
*B23K 20/12* (2006.01)

(52) U.S. Cl.
CPC ........ *B23K 20/125* (2013.01); *B23K 20/1255* (2013.01)

(58) Field of Classification Search
CPC .............. B23K 20/1265; B23K 20/125; B23K 20/1255; B23K 20/123; B23K 20/1245; B23K 20/122; B23K 20/126; B23K 20/12
See application file for complete search history.

(56) References Cited

U.S. PATENT DOCUMENTS 10,279,422 B2 * 5/2019 Werz .................. B23K 20/1255
10,442,029 B1 * 10/2019 Alsamhan ............ B23K 20/123
(Continued)

FOREIGN PATENT DOCUMENTS

JP   2007-029979 A   2/2007
JP   2007-216286 A   8/2007
(Continued)

*Primary Examiner* — Erin B Saad
(74) *Attorney, Agent, or Firm* — Oliff PLC

(57) ABSTRACT

A method for operating a double-action friction stir welding device including a welding tool having a pin member and a shoulder member, a projection/retraction mechanism for causing the pin member to project/retract relative to the shoulder member, a rotation mechanism for rotating a welding tool, and an advancing/retracting mechanism for advancing/retracting the welding tool, the method including cleaning at least one of the outer circumferential surface of the pin member and the inner circumferential surface of a through hole of the shoulder member on the basis of the level of an adhesion parameter correlated with the degree of adhesion of the material of a welding object, caused by friction stir welding, on the outer circumferential surface of the pin member and the inner circumferential surface of the through hole of the shoulder member.

20 Claims, 24 Drawing Sheets

(56) References Cited

U.S. PATENT DOCUMENTS

| | | | |
|---|---|---|---|
| 10,549,379 B2* | 2/2020 | Ito | B23K 20/1265 |
| 10,792,770 B1* | 10/2020 | Cleghorn | B23Q 3/088 |
| 10,919,108 B2* | 2/2021 | Okada | B23K 20/126 |
| 11,027,363 B2* | 6/2021 | Onose | B23K 20/1255 |
| 11,185,944 B2* | 11/2021 | Ohashi | B23K 20/1235 |
| 11,292,077 B2* | 4/2022 | Haruna | B23K 20/1245 |
| 11,440,132 B2* | 9/2022 | Ishiguro | B23K 20/123 |
| 2012/0006883 A1* | 1/2012 | Nishida | B23K 20/1245 228/2.1 |
| 2014/0069985 A1* | 3/2014 | Okada | B23K 20/122 228/2.1 |
| 2014/0069986 A1* | 3/2014 | Okada | B23K 20/26 228/2.1 |
| 2015/0183053 A1* | 7/2015 | Kumagai | B23K 20/1265 228/112.1 |
| 2015/0183054 A1* | 7/2015 | Okada | B23K 20/1245 228/2.1 |
| 2016/0074957 A1* | 3/2016 | Nishida | B23K 20/123 228/114.5 |
| 2016/0263696 A1* | 9/2016 | Nishida | B23K 20/16 |
| 2016/0318120 A1* | 11/2016 | Okada | B23K 20/126 |
| 2017/0304935 A1* | 10/2017 | Okada | B23K 20/12 |
| 2017/0341176 A1* | 11/2017 | Okada | B23K 20/125 |
| 2018/0257169 A1* | 9/2018 | Okada | B23K 20/129 |
| 2018/0297145 A1* | 10/2018 | Ohashi | B23K 20/12 |
| 2018/0304401 A1* | 10/2018 | Ohashi | B23K 20/123 |
| 2019/0143442 A1* | 5/2019 | Ohashi | B23K 11/16 428/172 |
| 2019/0201959 A1* | 7/2019 | Okada | B21D 5/004 |
| 2019/0262934 A1* | 8/2019 | Ohashi | B23K 20/12 |
| 2019/0314927 A1* | 10/2019 | Ohashi | B23K 20/1235 |
| 2021/0086291 A1* | 3/2021 | Okada | B23K 20/1245 |
| 2021/0331421 A1* | 10/2021 | Okada | B23K 20/1245 |
| 2022/0143739 A1* | 5/2022 | Hatano | B32B 7/05 |

FOREIGN PATENT DOCUMENTS

| | | |
|---|---|---|
| JP | 2009-202828 A | 9/2009 |
| KR | 10-2017-0081264 A | 7/2017 |
| WO | 2016/063538 A1 | 4/2016 |

\* cited by examiner

METHOD FOR OPERATING DOUBLE-ACTION FRICTION STIR WELDING DEVICE, AND DOUBLE-ACTION FRICTION STIR WELDING DEVICE

TECHNICAL FIELD

The present invention relates to a method for operating a double-action friction stir welding device, and a double-action friction stir welding device.

BACKGROUND ART

Conventionally, there is known FSW in which a welding object is welded by being softened and stirred by frictional heat due to rotation of a welding tool composed of a center pin and a shoulder pin, the center pin is inserted in the shoulder pin such that the head end of the center pin is projectable/retractable relative to the shoulder pin, and the welding tool is rotated by a stirring motor (see, for example, PTL 1). In this FSW, the surface of the center pin and the hole inner surface of the shoulder pin are cleaned to remove dust laid between the shoulder pin and the center pin at the time of friction stir welding (joining). This prevents operation fault of the center pin.

There is known a method for manufacturing a vehicle body including a steel plate material and a light metal plate material having a smaller specific gravity than the steel plate material (see, for example, PTL 2). The method disclosed in PTL 1 uses a double-action friction spot welding device which is capable of keeping the surface of a welding portion smooth when welding each of a front side portion and a rear side portion of a roof panel, and a header member.

CITATION LIST

Patent Literature

PTL 1: Japanese Laid-Open Patent Publication No. 2007-216286
PTL 2: Japanese Laid-Open Patent Publication No. 2009-202828

SUMMARY OF INVENTION

Technical Problem

However, the cleaning method for the welding tool in FSW disclosed in PTL 1 has a first problem that this method is insufficient in terms of prolonging the life of the welding tool.

The method disclosed in PTL 2 has a second problem that the welding strength is insufficient because only an aluminum alloy plate is caused to plastically flow in this method.

A first object of the present invention is to provide a method for operating a double-action friction stir welding device, and a double-action friction stir welding device, that enable the life of a welding tool to be prolonged.

A second object of the present invention is to provide a method for operating a double-action friction stir welding device, and a double-action friction stir welding device, that enable the welding strength to be enhanced even in the case of welding a plurality of members made of different materials using frictional heat.

Solution to Problem

In order to solve the first problem, a method for operating a double-action friction stir welding device according to one aspect of the present invention is a method for operating a double-action friction stir welding device for welding a welding object including a first member and a second member by softening the welding object with frictional heat, the double-action friction stir welding device including a cylindrical shoulder member having a cylindrical central through hole concentrically extending at a center, a cylindrical pin member forming a welding tool together with the shoulder member, and fitted into the central through hole of the shoulder member concentrically with the shoulder member, a projection/retraction mechanism configured to cause the pin member to project/retract relative to the shoulder member, a rotation mechanism configured to rotate the welding tool about a center axis of the pin member, and an advancing/retracting mechanism configured to advance/retract the welding tool in an extending direction of the center axis of the pin member, the method including: operation (A) of performing friction stir welding for the welding object through rotation of the welding tool by the rotation mechanism, projection/retraction of the pin member relative to the shoulder member by the projection/retraction mechanism, and advancement/retraction of the welding tool by the advancing/retracting mechanism; and operation (B) of cleaning at least one of an outer circumferential surface of the pin member and an inner circumferential surface of the central through hole of the shoulder member on the basis of a level of an adhesion parameter correlated with a degree of adhesion of a material of the welding object, caused by the friction stir welding, on the outer circumferential surface of the pin member and the inner circumferential surface of the central through hole of the shoulder member. Here, "cleaning on the basis of the level of the adhesion parameter" includes: performing cleaning while monitoring the adhesion parameter; and determining cleaning timings by analyzing the adhesion parameter in advance, and then performing cleaning without monitoring the adhesion parameter. The cleaning timings include one or more specific timings, irregular timings, and regular timings.

As described later, the welding count until the welding tool is broken is practically the life of the welding tool. The current of the drive motor for the pin member when the pin member is lifted increases as the welding count increases, and when a certain great absolute value is reached, the pin member or the shoulder member is broken. The current of the drive motor for the pin member is an example of the adhesion parameter correlated with the degree of adhesion of the material of the welding object, caused by friction stir welding, on the outer circumferential surface of the pin member and the inner circumferential surface of the central through hole of the shoulder member. According to the above configuration, at least one of the outer circumferential surface of the pin member and the inner circumferential surface of the central through hole of the shoulder member is cleaned on the basis of the level of the adhesion parameter correlated with the degree of adhesion of the material of the welding object, caused by friction stir welding, on the outer circumferential surface of the pin member and the inner circumferential surface of the central through hole of the shoulder member. Therefore, it is possible to suppress breakage of the welding tool by setting the level of the adhesion parameter at which cleaning should be carried out, to a level lower than the level at which the welding tool will be broken. As a result, the life of the welding tool can be prolonged.

The adhesion parameter may be a parameter having an absolute value that increases with increase in an amount of the adhesion, and a first threshold may be set for the absolute value of the adhesion parameter. Further, the method may further include operation (C) of performing warning when the adhesion parameter is equal to or greater than the first threshold, and the operation (B) may be performed after the operation (C). Here, the "warning" includes warning by a message using sound, characters, or the like, and warning by an alarm.

According to the above configuration, the adhesion parameter is a parameter having an absolute value that increases with increase in the amount of adhesion on the welding tool, and when the adhesion parameter is equal to or greater than the first threshold, warning is performed, and thereafter, the welding tool is cleaned. Therefore, it is possible to favorably suppress breakage of the welding tool by setting the first threshold to a level lower than the level at which the welding tool will be broken.

The method may further include prohibiting operation of the welding tool when the adhesion parameter is equal to or greater than a second threshold greater than the first threshold. Here, "prohibiting operation of the welding tool" includes stopping the welding tool that is in operation, and not allowing operation of the welding tool that is stopped.

According to the above configuration, when cleaning is not carried out even after warning, operation of the welding tool is prohibited. Therefore, it is possible to assuredly suppress breakage of the welding tool by setting the second threshold to a level lower than the level at which the welding tool will be broken.

The adhesion parameter may be a parameter having an absolute value that increases with increase in an amount of the adhesion, and the method may further include operation (D) of performing at least one of warning and prohibition of operation of the welding tool when an amount of increase in the adhesion parameter per predetermined period is equal to or great than a predetermined value.

According to the above configuration, when the adhesion parameter exhibits a tendency of increasing beyond the allowable limit, at least one of alarming and stopping of the welding tool is performed. Therefore, by setting the predetermined value as appropriate, it is possible to favorably suppress breakage of the welding tool in the case where the material of the welding object has such characteristics that the adhesion amount thereof on the welding tool sharply increases as the number of times of friction stir welding increases.

The adhesion parameter may be a current value of a motor provided to the projection/retraction mechanism and configured to drive the pin member to project/retract relative to the shoulder member.

According to the above configuration, it is possible to favorably suppress breakage of the welding tool.

The adhesion parameter may be a number of times of friction stir welding performed for a pair of the welding objects.

According to the above configuration, it is possible to favorably suppress breakage of the welding tool.

The adhesion parameter may be stress occurring in the pin member or the shoulder member.

According to the above configuration, it is possible to favorably suppress breakage of the welding tool.

A double-action friction stir welding device according to another aspect of the present invention includes: a cylindrical shoulder member having a cylindrical central through hole concentrically extending at a center; a cylindrical pin member forming a welding tool together with the shoulder member, and fitted into the central through hole of the shoulder member concentrically with the shoulder member; a projection/retraction mechanism configured to cause the pin member to project/retract relative to the shoulder member; a rotation mechanism configured to rotate the welding tool about a center axis of the pin member; an advancing/retracting mechanism configured to advance/retract the welding tool in an extending direction of the center axis of the pin member; and a controller, wherein the controller executes operation (A) of performing friction stir welding for the welding object through rotation of the welding tool by control of the rotation mechanism, projection/retraction of the pin member relative to the shoulder member by control of the projection/retraction mechanism, and advancement/retraction of the welding tool by control of the advancing/retracting mechanism, and operation (B1) of performing at least one of warning, prohibition of operation of the welding tool, and cleaning of the welding tool on the basis of a level of an adhesion parameter correlated with a degree of adhesion of a material of the welding object, caused by the friction stir welding, on the outer circumferential surface of the pin member and the inner circumferential surface of the central through hole of the shoulder member. Here, the cleaning timings include one or more specific timings, irregular timings, and regular timings.

According to the above configuration, at least one of warning, prohibition of operation of the welding tool, and cleaning of the welding tool is performed on the basis of the level of the adhesion parameter correlated with the degree of adhesion of the material of the welding object, caused by friction stir welding, on the outer circumferential surface of the pin member and the inner circumferential surface of the central through hole of the shoulder member. Therefore, it is possible to suppress breakage of the welding tool by setting the level of the adhesion parameter at which the above measures should be performed, to a level lower than the level at which the welding tool will be broken, and cleaning the welding tool accordingly, or cleaning the welding tool after warning or prohibition of operation of the welding tool. As a result, the life of the welding tool can be prolonged.

A method for operating a double-action friction stir welding device according to still another aspect of the present invention is a method for operating a double-action friction stir welding device for welding a welding object including members by softening the welding object with frictional heat, the double-action friction stir welding device including a cylindrical shoulder member having a cylindrical central through hole concentrically extending at a center, a cylindrical pin member forming a welding tool together with the shoulder member, and fitted into the central through hole of the shoulder member concentrically with the shoulder member, a projection/retraction mechanism configured to cause the pin member to project/retract relative to the shoulder member, a rotation mechanism configured to rotate the welding tool about a center axis of the pin member, and an advancing/retracting mechanism configured to advance/retract the welding tool in an extending direction of the center axis of the pin member, the method including: operation (A) of performing friction stir welding for the welding objects placed in contact with each other, through rotation of the welding tool by the rotation mechanism, projection/retraction of the pin member relative to the shoulder member by the projection/retraction mechanism, and advancement/retraction of the welding tool by the advancing/retracting mechanism; and operation (E) of cleaning at least one of an outer circumferential surface of the pin member and an inner circumferential surface of the central through hole of the shoulder member at a predetermined timing. Here, the predetermined timings include one or more specific timings, irregular timings, and regular timings. Specifically, as an example of the cleaning timings, cleaning may be performed when maintenance is performed regularly or irregularly, or after friction stir welding work is finished for the day.

A double-action friction stir welding device according to still another aspect of the present invention is a double-action friction stir welding device for welding a welding object including a first member and a second member by softening the welding object with frictional heat, the double-action friction stir welding device including: a cylindrical shoulder member having a cylindrical central through hole concentrically extending at a center; a cylindrical pin member forming a welding tool together with the shoulder member, and fitted into the central through hole of the shoulder member concentrically with the shoulder member; a projection/retraction mechanism configured to cause the pin member to project/retract relative to the shoulder member; a rotation mechanism configured to rotate the welding tool about a center axis of the pin member; an advancing/retracting mechanism configured to advance/retract the welding tool in an extending direction of the center axis of the pin member; and a controller, wherein the controller executes operation (A) of performing friction stir welding for the welding objects placed in contact with each other, through rotation of the welding tool by control of the rotation mechanism, projection/retraction of the pin member relative to the shoulder member by control of the projection/retraction mechanism, and advancement/retraction of the welding tool by control of the advancing/retracting mechanism, and operation (E) of performing at least one of warning, prohibition of operation of the welding tool, and cleaning of the welding tool at a predetermined timing. Here, the predetermined timings include one or more specific timings, irregular timings, and regular timings. Specifically, as an example of the cleaning timings, cleaning may be performed when maintenance is performed regularly or irregularly, or after friction stir welding work is finished for the day.

In order to solve the second problem, in the method for operating the double-action friction stir welding device according to the present invention, the first member is placed so as to be opposed to the welding tool, and is made of a material different from the second member, and the operation (A) includes operation (A1) of operating the rotation mechanism and the advancing/retracting mechanism so as to cause the welding tool to press a welding target portion of the welding object while rotating the welding tool, operation (A2) of operating the projection/retraction mechanism so as to cause a head end of the welding tool to reach a predetermined first position so that the softened second member is thrusted into the softened first member, and operation (A3) of operating the projection/retraction mechanism, the rotation mechanism, and the advancing/retracting mechanism so as to pull out the welding tool from the welding target portion while rotating the welding tool.

Thus, even if a plurality of members made of different materials are welded using frictional heat, the welding strength can be enhanced.

Further, in order to solve the second problem, in the double-action friction stir welding device according to the present invention, the first member is placed so as to be opposed to the welding tool, and is made of a material different from the second member, and the operation (A) includes operation (A1) of operating the rotation mechanism and the advancing/retracting mechanism so as to cause the welding tool to press a welding target portion of the welding object while rotating the welding tool, operation (A2) of operating the projection/retraction mechanism so as to cause a head end of the welding tool to reach a predetermined first position so that the softened second member is thrusted into the softened first member, and operation (A3) of operating the projection/retraction mechanism, the rotation mechanism, and the advancing/retracting mechanism so as to pull out the welding tool from the welding target portion while rotating the welding tool.

Thus, even if a plurality of members made of different materials are welded using frictional heat, the welding strength can be enhanced.

The above objects and other objects, features, and advantages of the present invention will become more apparent from the detailed description of the preferred embodiments below when taken in conjunction with the accompanying drawings.

Advantageous Effects of Invention

The method for operating a double-action friction stir welding device, and the double-action friction stir welding device, according to the present invention enable the life of a welding tool to be prolonged.

In addition, the method for operating a double-action friction stir welding device, and the double-action friction stir welding device, according to the present invention enable the welding strength to be enhanced even if a plurality of members made of different materials are welded using frictional heat.

Figure 1:
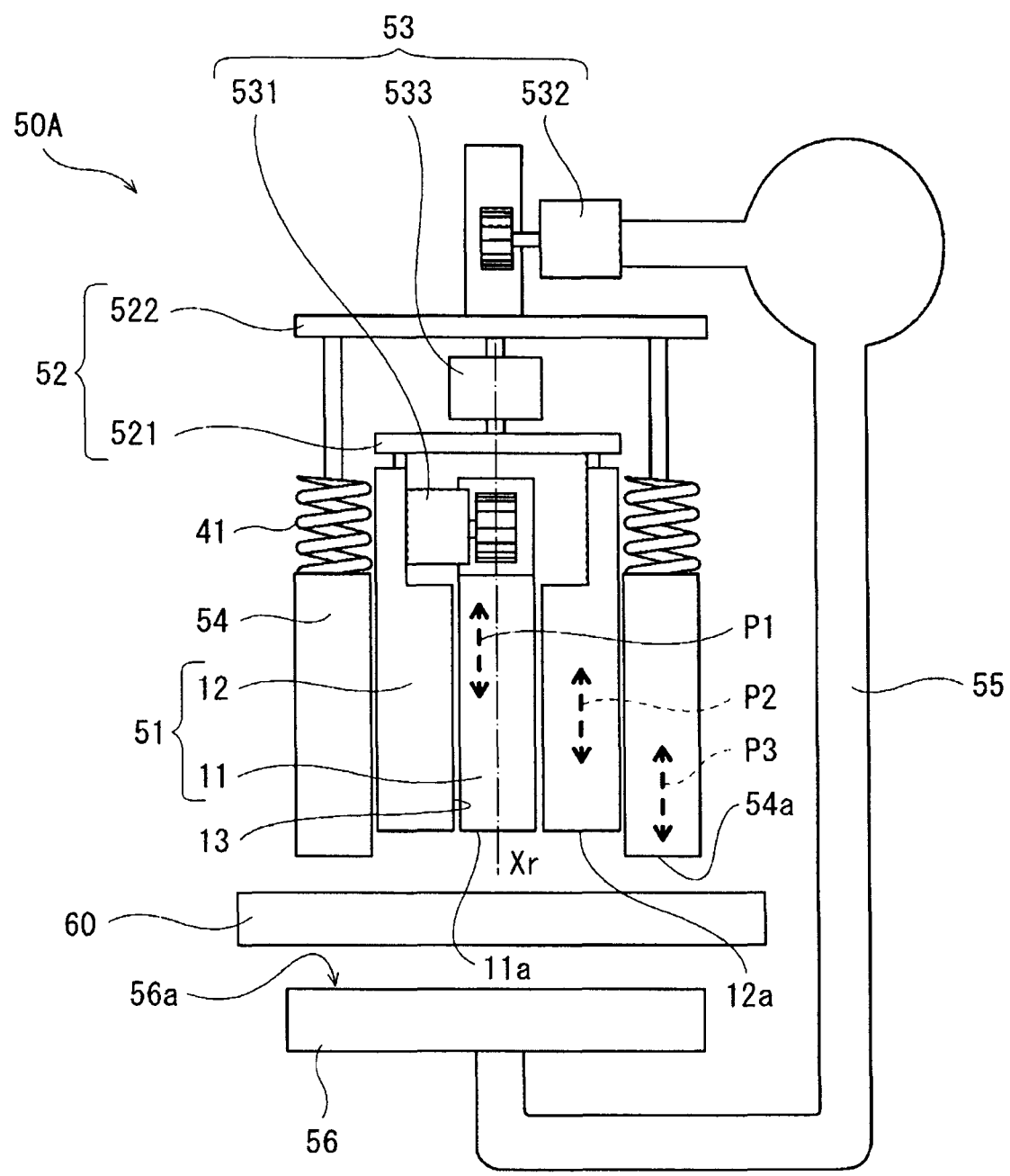
FIG. 1 is a side view schematically showing the hardware configuration of a double-action friction stir welding device according to embodiment 1.

DESCRIPTION OF EMBODIMENTS (Knowledge that has LED to the Present Invention)

In double-action friction stir welding, the finished surface is smooth. In some fields of industry, adoption of double-action friction stir welding is desired in terms of design. In such fields, reduction of cost per welding is required.

In double-action friction stir welding, the life of a pin member ends when the pin member is broken. That is, the welding count until the pin member is broken is practically the life of the pin member. The present inventors have studied prolonging of the life of the pin member in order to reduce the cost per welding. The pin member is broken in a process of lifting the pin member so as to retract the head end thereof relative to the shoulder member. Through the process of studying prolonging of the life of the pin member, the present inventors have found that current of a drive motor for the pin member when the pin member is lifted increases as the welding count increases, and when a certain great absolute value is reached, the pin member is broken (see FIG. 4). The present inventors inferred that the increase in current of the drive motor for the pin member is due to adhesion of a material (aluminum alloy) of a welding object on the outer circumferential surface of the pin member and the inner circumferential surface of a central through hole of the shoulder member, and accordingly, removed (cleaned) the aluminum adhering on the outer circumferential surface of the pin member of the welding tool and the inner circumferential surface of the central through hole of the shoulder member for which current of the drive motor increased with the welding count. As a result, current of the drive motor is reduced. The welding count by this welding tool has reached 40000, but the pin member has not been broken yet. This experiment is still ongoing.

In addition, it has been found that the shoulder member is broken in the case of using a welding tool in which a pin member has a great diameter. Further, it has been found that the time when the welding tool will be broken (life) depends on the material of the welding object.

The present invention has been made on the basis of the above knowledge. The above knowledge will be described in detail later, with reference to FIG. 4.

(Position of Technology Described in PTL 1 Relative to the Present Invention)

In general, in the case of performing spot welding by FSW, it is required to perform one spot welding in as short a time as possible in order to reduce the cost for spot welding. Therefore, it is not realistic to clean a welding tool every time spot welding is performed. However, PTL 1 has no mention about the timing (frequency) of cleaning the welding tool. In the first place, PTL 1 has no mention (no recognition) about the fact that cleaning of the welding tool influences the life of the welding tool. In the case of attempting to clean the welding tool in accordance with the description in PTL 1, the welding tool might be broken before cleaning is performed because the timing thereof is too late. Therefore, the cleaning method of PTL 1 cannot prolong the life of the welding tool.

Hereinafter, embodiments of the present invention will be specifically described with reference to the drawings. In the following description, the same or corresponding elements are denoted by the same reference characters in all the drawings and such elements are not repetitively described. In addition, since the drawings below are for explaining the present invention, elements irrelevant to the present invention may be omitted, simplified, or exaggerated, or some of the drawings may not match each other.

Embodiment 1

[Hardware Configuration]

FIG. 1 is a side view schematically showing the hardware configuration of a double-action friction stir welding device according to the present embodiment 1. Although the double-action friction stir welding device has no directions, in the following description, for convenience sake, the up-down direction in FIG. 1 is defined as the up-down direction of the double-action friction stir welding device.

With reference to FIG. 1, a double-action friction stir welding device 50A according to embodiment 1 of the present invention includes: a cylindrical shoulder member 12 having a cylindrical central through hole 13 concentrically extending at the center; a cylindrical pin member 11 forming a welding tool 51 together with the shoulder member 12 and fitted into the central through hole 13 of the shoulder member 12 concentrically with the shoulder member 12; a projection/retraction mechanism (pin drive portion 531) configured to cause the pin member 11 to project/retract relative to the shoulder member 12; a rotation mechanism (521, 533) configured to rotate the welding tool 51 and the projection/retraction mechanism (pin drive portion 531) together about a center axis Xr of the pin member 11; and an advancing/retracting mechanism (522, 532) configured to advance/retract the welding tool 51, the projection/retraction mechanism (pin drive portion 531), and the rotation mechanism (521, 533) together in the extending direction of the center axis Xr of the pin member 11, and a welding object 60 is subjected to friction stir welding through rotation of the welding tool 51 by the rotation mechanism (521, 533), projection/retraction of the pin member 11 relative to the shoulder member 12 by the projection/retraction mechanism (pin drive portion 531), and advancement/retraction of the welding tool 51 by the advancing/retracting mechanism (522, 532). Further, the double-action friction stir welding device 50A is configured to perform at least one of warning, prohibition of operation of the welding tool 51, and cleaning of the welding tool 51, on the basis of the level of an adhesion parameter correlated with the degree of adhesion of the material of the welding object 60, caused by friction stir welding, on the outer circumferential surface of the pin member 11 and the inner circumferential surface of the central through hole 13 of the shoulder member 12. In the following description, the case of performing warning and stopping of the welding tool 51 (one example of prohibition of operation) will be exemplified.

Hereinafter, the configuration of the double-action friction stir welding device 50A will be specifically described. With reference to FIG. 1, here, the double-action friction stir welding device 50A is formed as an end effector, i.e., a welding gun, attached to the end of a robot arm. As a matter of course, the double-action friction stir welding device 50A may be configured in a form other than a welding gun. The double-action friction stir welding device 50A has a C-shaped frame 55 formed in a C shape. The C-shaped frame 55 is attached to the end of the robot arm. A shoulder drive portion 532 is provided at an upper end of the C-shaped frame 55.

The shoulder drive portion 532 is formed of a servomotor and a lifting/lowering mechanism, for example. A movable body 522 is connected to the shoulder drive portion 532 so as to be able to be lifted and lowered. Examples of the lifting/lowering mechanism include a ball screw, and a rack and pinion.

Here, the movable body 522 is formed in a disk shape. A clamp drive portion 41 is provided at the outer circumference of the movable body 522 so as to extend downward. The clamp drive portion 41 is formed of a coil-shaped compression spring, for example. A cylindrical clamp member 54 is provided at the lower end of the clamp drive portion 41 so as to extend downward. The clamp member 54 is provided such that the center axis thereof coincides with the predetermined rotation axis Xr. The predetermined rotation axis extends in the up-down direction. Therefore, the extending direction of the predetermined rotation axis is the same as the direction of a lifting/lowering movement of the movable body 522. A rotation drive portion 533 is provided at the center of the movable body 522. The rotation drive portion 533 is formed of a motor. The rotation axis of rotational driving by the rotation drive portion 533 coincides with the predetermined rotation axis Xr. A rotary body 521 is connected to the rotation drive portion 533. Here, the rotary body 521 is formed in a disk shape. The shoulder member 12 is provided at the outer circumference of the rotary body 521 so as to extend downward. The shoulder member 12 is formed in a cylindrical shape and has the cylindrical central through hole 13 concentrically extending at the center part. An upper part of the central through hole 13 has a large diameter, and the remaining part has a smaller diameter than the upper part. The shoulder member 12 is concentrically fitted into the internal space of the clamp member 54. Therefore, the center axis of the shoulder member 12 coincides with the predetermined rotation axis. The movable body 522 and the rotary body 521 form a welding tool fixing portion 52.

The pin drive portion 531 is provided at the upper part of the central through hole 13 of the shoulder member 12. The pin drive portion 531 is formed of a servomotor and a lifting/lowering mechanism, for example. The pin member 11 is connected to the pin drive portion 531 so as to be able to be lifted and lowered. Examples of the lifting/lowering mechanism include a ball screw, and a rack and pinion.

The pin member 11 is formed in a cylindrical shape and has an upper end connected to the pin drive portion 531. The pin member 11 is fitted into the central through hole 13 of the shoulder member 12 concentrically with the shoulder member 12. Therefore, the center axis Xr of the pin member 11 coincides with the predetermined rotation axis. When the pin member 11 is located at a reference position, a lower end surface 11a thereof is located at the same height as a lower end surface 12a of the shoulder member 12. Therefore, when the pin drive portion 531 lowers the pin member 11 from the reference position, the pin member 11 projects downward from the shoulder member 12, and when the pin drive portion 531 lifts the pin member 11 from the reference position, the pin member 11 retracts into the shoulder member 12. Thus, the pin drive portion 531 forms a projection/retraction mechanism.

The pin member 11 and the shoulder member 12 are formed of cemented carbide, tool steel, high-speed steel, ceramics, or the like. Here, the pin member 11 and the shoulder member 12 are formed of cemented carbide. Surface coating layers are formed on the outer circumferential surface of the pin member 11 and the inner circumferential surface of the central through hole 13 of the shoulder member 12. Examples of the material of the surface coating layers include diamond and hydrogen-free DLC. The surface coating layers are provided for reducing the affinity of the pin member 11 and the shoulder member 12 with respect to aluminum which is the material of the welding object. The pin member 11 and the shoulder member 12 form the welding tool 51. When the rotation drive portion 533 rotates the rotary body 521, the shoulder member 12 and the pin member 11 are rotated together. Thus, the rotation drive portion 533 and the rotary body 521 form the "rotation mechanism" for the welding tool 51.

The clamp member 54 and the welding tool 51 are configured such that, when the pin member 11 is located at the reference position, a lower end surface 54a of the clamp member 54 is located lower than the lower end surface 11a of the pin member 11 and the lower end surface 12a of the shoulder member 12 by a predetermined dimension. That is, there is a step between the lower end surface 54a of the clamp member 54, and the lower end surface 11a of the pin member 11 and the lower end surface 12a of the shoulder member 12.

A back contact member 56 is provided at the lower end of the C-shaped frame 55. The back contact member 56 is provided so as to be opposed to the lower ends of the clamp member 54 and the welding tool 51. The welding object 60 is to be placed on a support surface 56a of the back contact member 56.

Therefore, when the shoulder drive portion 532 lifts/lowers the movable body 522, the welding tool 51, the "projection/retraction mechanism" (pin drive portion 531), the "rotation mechanism" (533, 521), and the clamp member 54 advance/retract relative to the welding object 60. Thus, the shoulder drive portion 532 and the movable body 522 form the "advancing/retracting mechanism" for the welding tool 51.

When the welding tool 51 is advanced (lowered) toward the welding object 60 by the shoulder drive portion 532, owing to the aforementioned step, the lower end surface 54a of the clamp member 54 first comes into contact with the welding object 60, and then the lower end surface 11a of the pin member 11 and the lower end surface 12a of the shoulder member 12 come into contact with the welding object 60. Thus, the compression spring forming the clamp drive portion 41 is compressed by the amount of the aforementioned step, and by the resilient force thereof, the clamp member 54 presses the welding object 60.

[Configuration of Control System]

Figure 2:
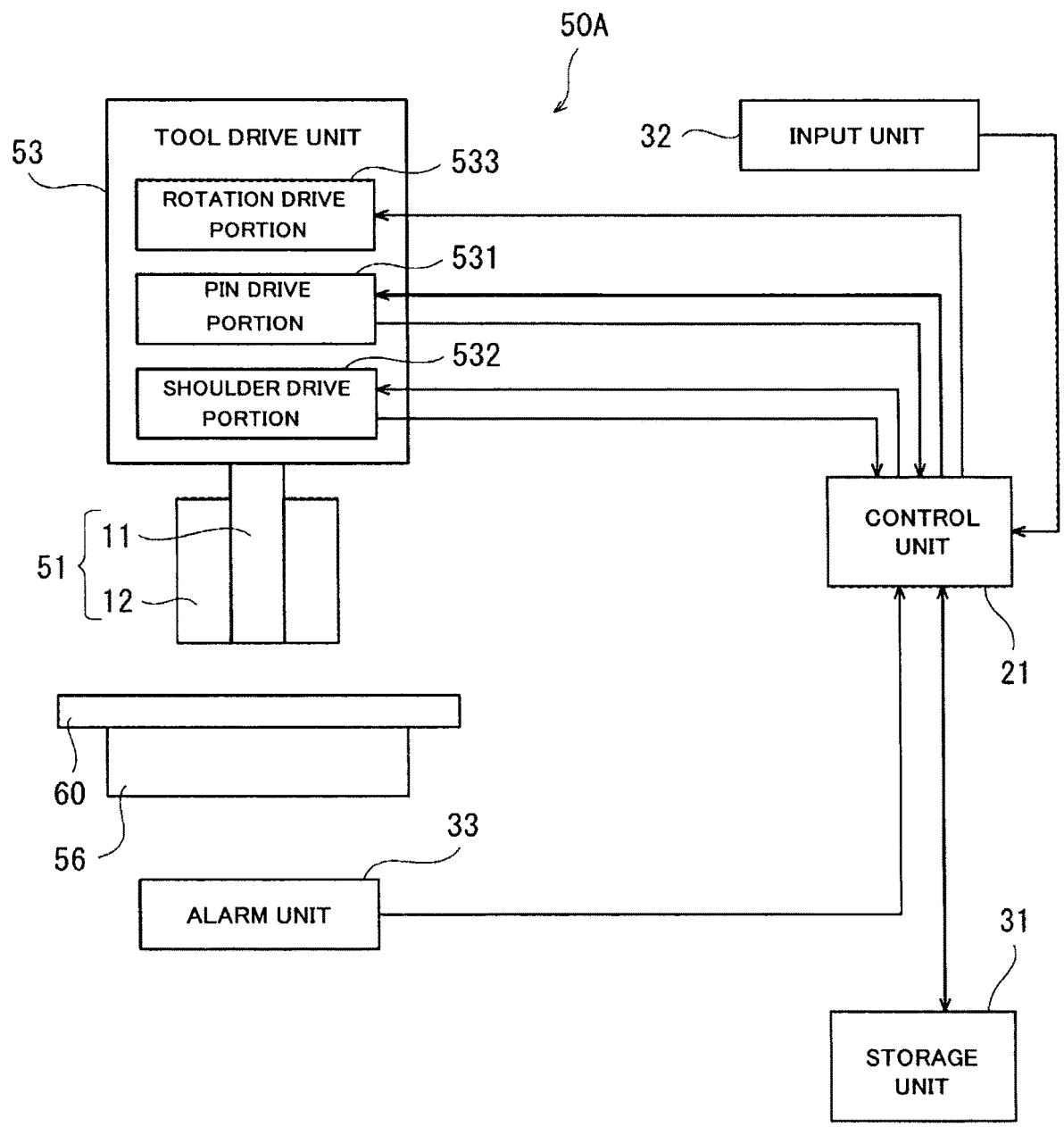
FIG. 2 is a block diagram showing the configuration of a control system of the double-action friction stir welding device shown in FIG. 1.

FIG. 2 is a block diagram showing the configuration of a control system of the double-action friction stir welding device shown in FIG. 1. With reference to FIG. 2, the double-action friction stir welding device 50A includes a tool drive unit 53, an alarm unit 33, a control unit 21, a storage unit 31, and an input unit 32.

First, the adhesion parameter will be described. The adhesion parameter is a parameter correlated with the degree of adhesion of the material of the welding object 60, caused by friction stir welding, on the outer circumferential surface of the pin member 11 and the inner circumferential surface of the central through hole 13 of the shoulder member 12. Examples of the adhesion parameter include the current value (hereinafter, referred to as motor current value) of the motor of the pin drive portion 531 for driving the pin member 11 to project/retract relative to the shoulder member 12, the welding count which is the number (number of times) of friction stir welding operations, and stress occurring in the pin member 11 or the shoulder member 12. These parameters are parameters having absolute values that increase (the levels increase) as the amount of adhesion increases (the level increases). Patterns of breakage of the welding tool include breakage of the pin member 11 and breakage of the shoulder member 12. The signs of the motor current value and the stress are inverted between the two breakage patterns. Therefore, the level of the adhesion parameter is specified by the absolute value thereof. In the following description, the case where the motor current value of the pin drive portion 531 is used as the adhesion parameter is exemplified.

The tool drive unit 53 includes the pin drive portion 531, the shoulder drive portion 532, and the rotation drive portion 533.

The alarm unit 33 has a function of notifying (warning) an operator that the adhesion parameter has reached a level at which caution for breakage of the welding tool 51 is required. The alarm unit 33 is formed of a buzzer, a signal tower, PATLITE (registered trademark), or a loudspeaker, for example. The alarm unit 33 is provided at, for example, an appropriate location in a work area where the double-action friction stir welding device 50A is used.

Here, the input unit 32 is used for inputting a start command, a stop command, a first threshold and a second threshold for the adhesion parameter, and the like. The input unit 32 is formed of an input device such as a touch panel, a mouse, or a keyboard. The input unit 32 is provided at, for example, an appropriate location in the work area where the double-action friction stir welding device 50A is used.

The control unit 21 and the storage unit 31 are formed integrally as a controller. The control unit 21 reads and executes a predetermined control program stored in the storage unit 31, to control operation of the tool drive unit 53.

The control unit 21 stores, in the storage unit 31, the first threshold and the second threshold for the adhesion parameter, inputted from the input unit 32. The controller including the control unit 21 and the storage unit 31 may be a single controller that performs centralized control, or may be composed of a plurality of controllers that cooperate with each other to perform decentralized control. The controller (control unit 21 and storage unit 31) is formed of a microcontroller, an MPU, a field programmable gate array (FPGA), a programmable logic controller (PLC), or the like. The control unit 21 and the storage unit 31 are each formed of a computation unit and a memory of such a computation device (processor).

The controller (control unit 21 and storage unit 31) is provided at, for example, an appropriate location in the work area where the double-action friction stir welding device 50A is used.

Specifically, the control unit 21 performs position control of the servomotors forming the pin drive portion 531 and the shoulder drive portion 532. In addition, the control unit 21 controls rotation of the motor forming the rotation drive portion 533. Further, the control unit 21 monitors the adhesion parameter (motor current value (absolute value) of the pin drive portion 531). Then, when the adhesion parameter has become the first threshold or greater, the control unit 21 causes the alarm unit 33 to issue (emit) an alarm, and when the adhesion parameter has become the second threshold or greater, the control unit 21 stops the double-action friction stir welding device 50A.

[Operations]

Next, operations of the double-action friction stir welding device 50A configured as described above will be described regarding friction stir welding operation, and alarming and stop control for the welding tool based on the adhesion parameter, individually. It is noted that the following operations are executed by the control unit 21 reading programs stored in the storage unit 31.

<Friction Stir Welding Operation>

First, the friction stir welding operation will be briefly described. FIG. 3(a) to FIG. 3(f) are schematic views showing an example of the friction stir welding operation of the double-action friction stir welding device shown in FIG. 1. In the following description, the case where a pair of metal plates 61 and 62 as the welding object 60 are overlaid in contact with each other and are joined by spot welding, is exemplified. In FIG. 3(a) to FIG. 3(f), arrows p indicate the movement direction of the welding tool 51 (corresponding to the directions of broken line arrows P1 to P2 in FIG. 1), black-headed arrows indicate the rotation direction of the welding tool (pin member 11 and shoulder member 12), and block arrows indicate directions of forces applied to the metal plates 61 and 62. Although force is also applied from the back contact member 56 to the metal plates 61 and 62, for convenience sake, this force is not shown in FIG. 3(a) to FIG. 3(f). The shoulder member 12 has a dotted pattern drawn thereon so as to be clearly distinguished from the pin member 11 and the clamp member 54. The following operation is performed by the control unit 21 controlling the tool drive unit 53, but the control unit 21 and the tool drive unit 53 are not mentioned in the following description.

In a series of steps shown in FIG. 3(a) to FIG. 3(f), the pin member 11 is pressed into the metal plates 61 and 62 before the shoulder member 12 is pressed into the metal plates 61 and 62.

Figure 3:
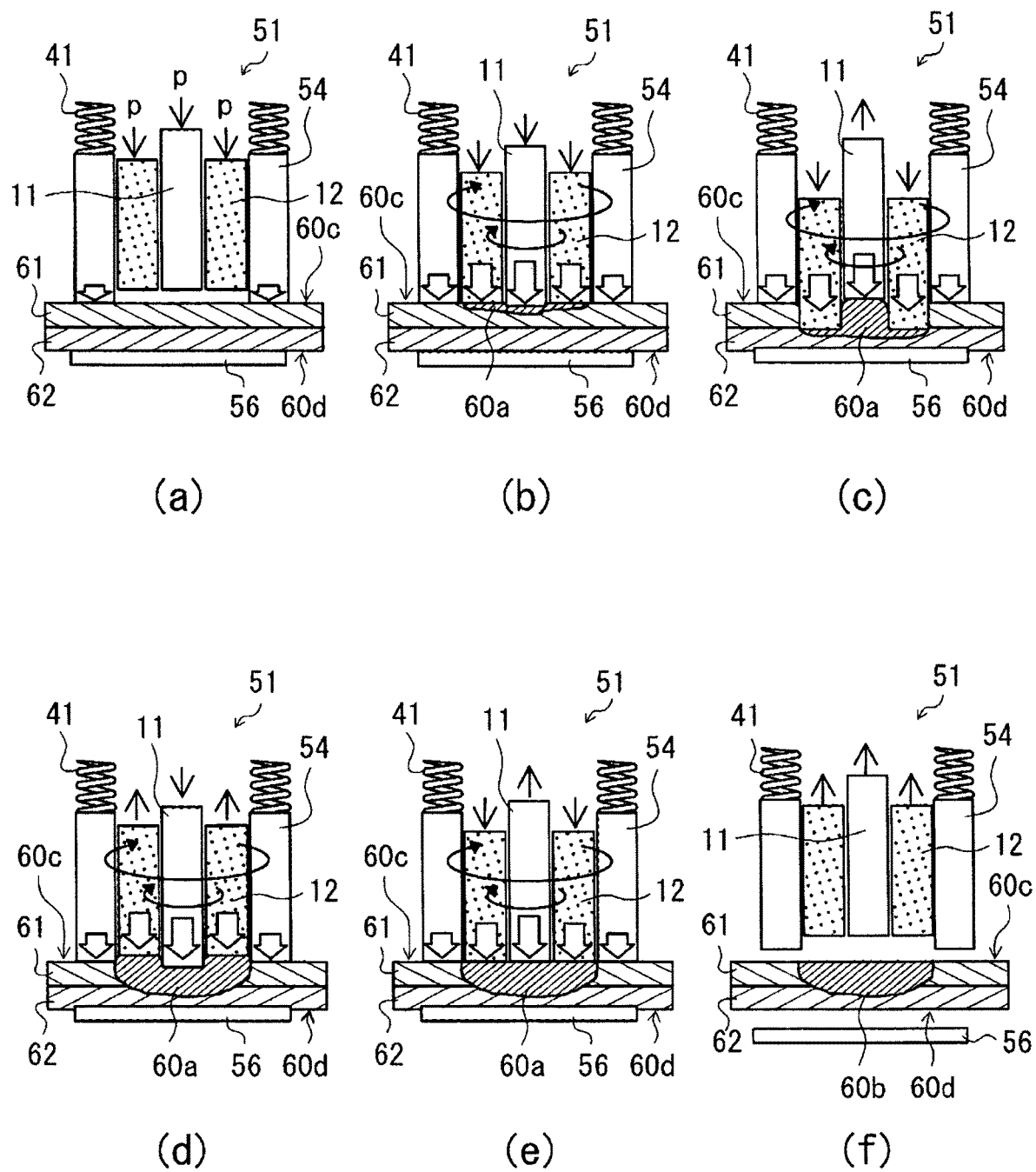
FIG. 3(a) to FIG. 3(f) are schematic diagrams showing an example of friction stir welding operation of the double-action friction stir welding device shown in FIG. 1.

Specifically, as shown in FIG. 3(a), the welding tool 51 is brought close to the metal plates 61 and 62 (arrows p in the drawing), so that the lower end surface 54a (not indicated by reference character in FIG. 3(*a*) to FIG. 3(*f*)) of the clamp member 54 is brought into contact with a front surface 60*c* of the upper metal plate 61 and the back contact member 56 is brought into contact with a back surface 60*d* of the lower metal plate 62. Thus, the metal plates 61 and 62 are held between the clamp member 54 and the back contact member 56, and a clamping force is generated by pressing from the clamp member 54 (block arrow F in the drawing).

Next, as shown in FIG. 3(*b*), the welding tool 51 comes close to the metal plates 61 and 62 so that the lower end surface 11*a* (not indicated by reference character in FIG. 3(*a*) to FIG. 3(*f*)) of the pin member 11 and the lower end surface 12*a* (not indicated by reference character in FIG. 3(*a*) to FIG. 3(*f*)) of the shoulder member 12 come into contact with the front surface 60*c* of the metal plate 61. In this state, the clamping force of the clamp member 54 is generated by the resilient force of the clamp drive portion 41 formed of a compression spring. Then, the pin member 11 and the shoulder member 12 are rotated in contact with the front surface 60*c* of the metal plate 61 (black-headed arrows in the drawing).

In this state, neither the pin member 11 nor the shoulder member 12 advances or retracts, and therefore the front surface 60*c* of the metal plate 61 is to be "preliminarily heated". Thus, the metal material in the contact area of the metal plate 61 generates heat due to friction so as to soften, whereby a plastic-flow portion 60*a* is formed near the front surface 60*c* of the metal plate 61.

Next, as shown in FIG. 3(*c*), the shoulder drive portion 532 causes the shoulder member 12 to project relative to the pin member 11 so that the shoulder member 12 is further advanced (pressed) to the inside from the front surface 60*c* of the metal plate 61. Thus, the plastic-flow portion 60*a* reaches the lower metal plate 62 from the upper metal plate 61, and the softened metal material of the plastic-flow portion 60*a* is pushed away by the shoulder member 12, so as to flow from an area directly under the shoulder member 12 to an area directly under the pin member 11. Accordingly, the pin member 11 retracts and is lifted up as seen from the shoulder member 12.

Next, as shown in FIG. 3(*d*), the projecting shoulder member 12 is gradually retracted (drawn back) while the pin member 11 is advanced (pressed) into the metal plate 61.

Next, as shown in FIG. 3(*e*), the pin member 11 is gradually retracted. Thus, the recess formed by the shoulder member 12 or the pin member 11 being pressed is filled back. The lower end surface 11*a* of the pin member 11 and the lower end surface 12*a* of the shoulder member 12 are eventually aligned so as to form almost no steps from each other (so as to be flush with each other).

Finally, as shown in FIG. 3(*f*), the welding tool 51 and the back contact member 56 are separated from the metal plates 61 and 62, whereby a series of friction stir spot welding operations are finished. At this time, rotation (and pressing) due to contact with the welding tool 51 is no longer applied to the metal plates 61 and 62. Therefore, plastic flow of the plastic-flow portion 60*a* formed in both of the metal plates 61 and 62 stops, so that the plastic-flow portion 60*a* becomes a welded portion 60*b*. Thus, the pair of metal plates 61 and 62 are joined by the welded portion 60*b*.

<Alarming and Stop Control for Welding Tool>

Next, alarming and stop control for the welding tool, which characterize the present invention, will be described.

First, as a basis of the control, the change characteristics of the motor current value with respect to the welding count of the welding tool 51 will be described. As described above, the "motor current value" is the current value of the motor forming the pin drive portion 531 which drives the pin member 11 to project/retract.

Figure 4:
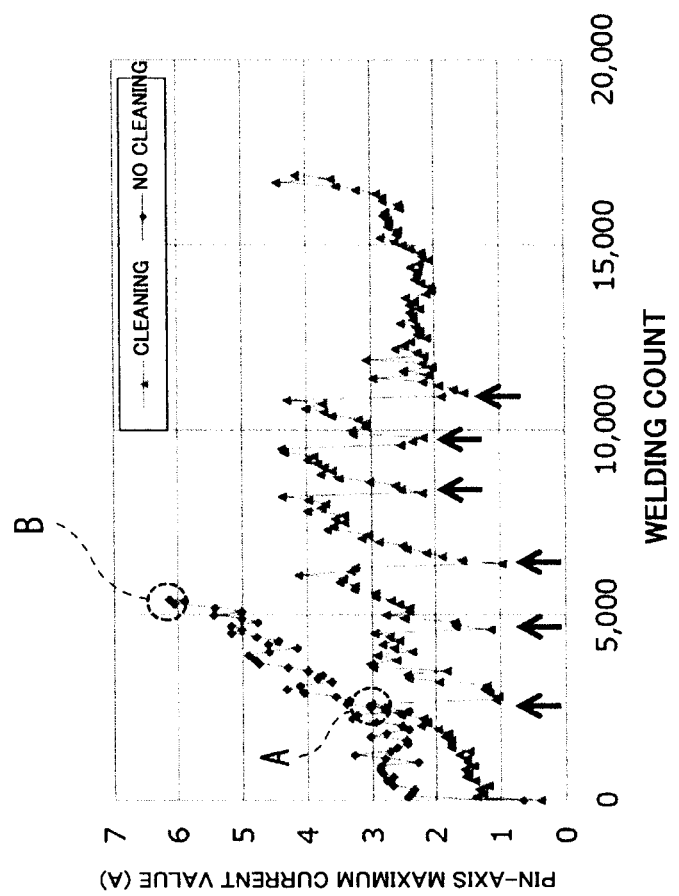
FIG. 4 is a graph showing change in the current value of a motor for driving a pin member to project/retract, with respect to the welding count.

FIG. 4 is a graph showing change in the current value of the motor for driving the pin member to project/retract, with respect to the welding count. The vertical axis in FIG. 4 indicates the maximum current value (hereinafter, referred to as pin-axis maximum current value) of the motor forming the pin drive portion 531 at the time of welding. The "maximum current value at the time of welding" is the current value of the motor forming the pin drive portion 531 in the step in FIG. 3(*c*) described above. In FIG. 4, a curve (hereinafter, referred to as first curve) obtained by connecting rhombus plot points by lines represents change in the pin-axis maximum current value with respect to the welding count in the case of not cleaning the welding tool 51, and a curve (hereinafter, referred to as second curve) obtained by connecting triangular plot points by lines represents change in the pin-axis maximum current value with respect to the welding count in the case of intermittently cleaning the welding tool 51. In the first curve, point A is a point at which the degree of adhesion on the welding tool 51 was observed, and point B is a point at which the pin member 11 of the welding tool 51 was broken (sheared). In the second curve, points indicated by a plurality of (six) arrows are points at which the welding tool 51 was cleaned.

In the experiment for obtaining the data shown in FIG. 4, a welding object 60 made from a 5000-series aluminum alloy was used.

With reference to FIG. 4, in the case of not cleaning the welding tool 51, the pin-axis maximum current value increased substantially in proportion to the welding count, and breakage occurred when the welding count reached about 5000, as shown by the first curve. The breakage of the pin member 11 occurred when the pin member 11 was lifted (drawn (retracted) into the shoulder member 12) in the step shown in FIG. 3(*c*). Hereinafter, the end of life when the pin member 11 is broken as the welding count increases is referred to as a breakage life of the pin member 11. As described later, the shoulder member 12 is also broken as the welding count increases, and this is referred to as a breakage life of the shoulder member 12. Breakage of the welding tool 51 due to increase in the welding count is referred to as a breakage life of the welding tool 51.

On the other hand, in the case of cleaning the welding tool 51, as shown by the second curve, the pin-axis maximum current value was reduced every time the welding tool 51 was cleaned, and the welding tool 51 has not been broken even at a welding count of 17000, while the experiment is still ongoing. According to the latest data, the welding tool 51 has not been broken at a welding count of 40000.

Figure 5A:
FIG. 5A is a photograph showing adhesion of the material of a welding object on the outer circumferential surface of the pin member.
Figure 5B:
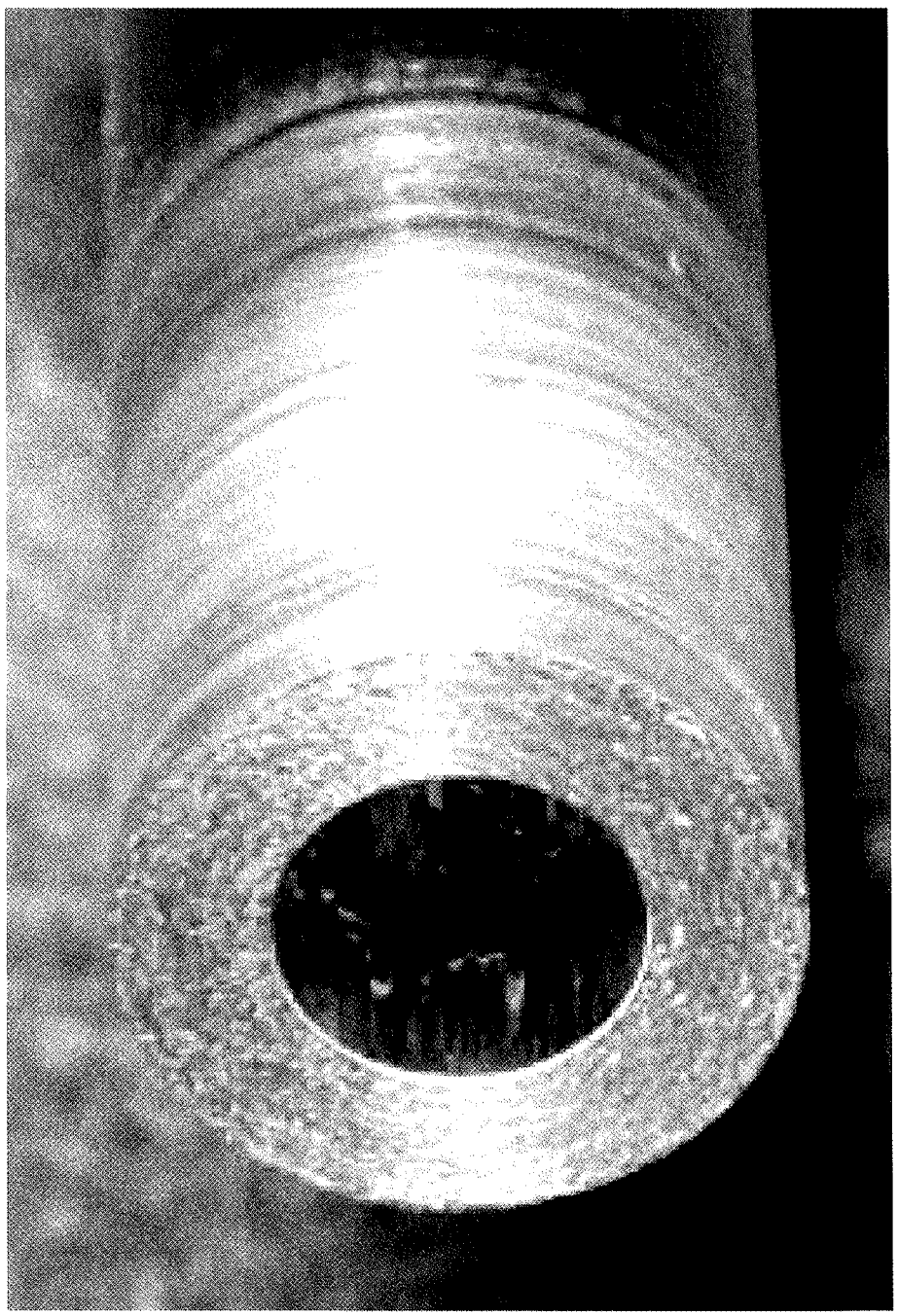
FIG. 5B is a photograph showing adhesion of the material of the welding object on the inner circumferential surface of a central through hole of a shoulder member.

FIG. 5A is a photograph showing adhesion of the material of the welding object 60 on the outer circumferential surface of the pin member 11 at point A in the first curve. FIG. 5B is a photograph showing adhesion of the material of the welding object 60 on the inner circumferential surface of the central through hole 13 of the shoulder member 12 at point A in the second curve. With reference to FIG. 5A and FIG. 5B, it is found that the aluminum alloy which is the material of the welding object 60 adheres on the outer circumferential surface of the pin member 11 and the inner circumferential surface of the central through hole 13 of the shoulder member 12.

From the above facts, it is inferred that the following mechanism progresses. In friction stir welding, the material of the welding object 60 enters an area between the outer circumferential surface of the pin member 11 and the inner circumferential surface of the central through hole 13 of the shoulder member 12, so that this material adheres onto the outer circumferential surface of the pin member 11 and the inner circumferential surface of the central through hole 13 of the shoulder member 12. As a result, stress of the pin member 11 (in this case, tensile stress) in friction stir welding increases. The increase in the stress leads to increase in the pin-axis maximum current value. The adhesion amount of the material of the welding object 60 on the welding tool 51 increases with increase in the welding count, and the stress of the pin member 11 in friction stir welding increases accordingly. Then, when the stress exceeds the allowable stress of the pin member 11, the pin member 11 is broken.

It is noted that the stress (tensile stress) of the pin member 11 at the time of breakage is beyond the shearing capacity of the material of the pin member 11, and therefore breakage of the pin member 11 is not ascribable to deterioration of the pin member.

In addition, in the case where the diameter of the pin member 11 was large, it was confirmed that the shoulder member 12 was broken in the step shown in FIG. 3(d).

Further, in the case where the material of the welding object 60 was a 6000-series aluminum alloy which has higher plastic fluidity than 5000-series aluminum alloys, it was confirmed that the amount of adhesion on the welding tool 51 was great. From this, it is inferred that ease of breakage of the welding tool 51 due to increase in the welding count depends on the material of the welding object 60.

The alarming and stop control for the welding tool described below are prescribed on the basis of the above knowledge.

Figure 6:
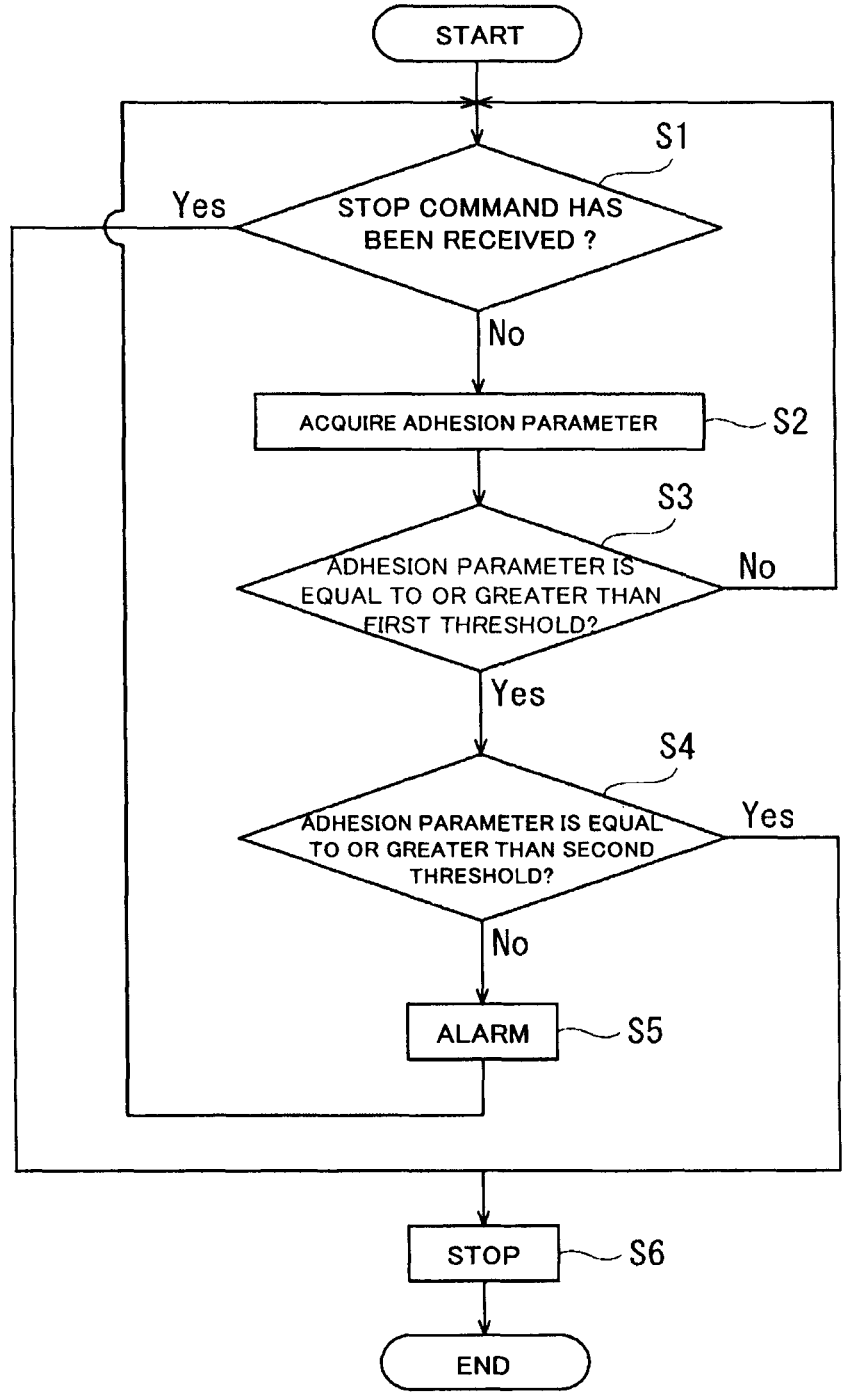
FIG. 6 is a flowchart showing alarming and stop control for a welding tool based on an adhesion parameter of the double-action friction stir welding device shown in FIG. 1.

FIG. 6 is a flowchart showing alarming and stop control for the welding tool based on the adhesion parameter of the double-action friction stir welding device shown in FIG. 1.

With reference to FIG. 2 and FIG. 6, alarming and stop control (hereinafter, referred to as main control) for the welding tool 51 are performed by the control unit 21 controlling the tool drive unit 53 and the alarm unit 33 on the basis of the adhesion parameter (here, the motor current value of the pin drive portion 531).

When friction stir welding is started, the control unit 21 starts the main control, and first, determines whether or not the stop command has been received (step S1). If the stop command has been received (Yes in step S1), the process proceeds to step S6, to stop the double-action friction stir welding device 50A and finish the main control. If the stop command has not been received (No in step S1), the control unit 21 acquires the adhesion parameter (step S2).

Next, the control unit 21 determines whether or not the adhesion parameter is equal to or greater than the first threshold (step S3). The first threshold is set to a smaller absolute value (lower level) than the absolute value (level) of the adhesion parameter corresponding to the breakage life of the pin member 11 and the shoulder member 12. The first threshold is determined through an experiment, simulation, calculation, or the like. Here, for example, the pin-axis maximum current value at which the pin member 11 is broken is 6 A, and the first threshold is 4 A.

If the adhesion parameter is not equal to or greater than the first threshold (No in step S3), the process returns to step S1. In this way, the control unit 21 monitors the adhesion parameter.

If the adhesion parameter is equal to or greater than the first threshold (Yes in step S3), the control unit 21 determines whether or not the adhesion parameter is equal to or greater than the second threshold (step S4). The second threshold is set to an absolute value smaller than the absolute value of the adhesion parameter corresponding to the breakage life of the pin member 11 and the shoulder member 12 and greater than the first threshold. The second threshold is determined through an experiment, simulation, calculation, or the like. Here, for example, the second threshold is 5 A.

If the adhesion parameter is not equal to or greater than the second threshold (No in step S2), the control unit 21 causes an alarm to be issued (step S5), and returns to step S1. In response to this alarm, the operator inputs the stop command via the input unit 32 of the double-action friction stir welding device 50A. Accordingly, the control unit 21 stops the double-action friction stir welding device 50A (Yes in step S1; step S6). Thus, the main control is finished. Thereafter, the operator cleans the welding tool 51. Thus, breakage of the welding tool 51 is prevented and the life of the welding tool 51 is prolonged.

On the other hand, if the adhesion parameter is equal to or greater than the second threshold (Yes in step S2), the control unit 21 stops the double-action friction stir welding device 50A, whereby the welding tool 51 is stopped (step S6). Thus, the main control is finished. Thereafter, the operator cleans the welding tool 51. Thus, breakage of the welding tool 51 is prevented and the life of the welding tool 51 is prolonged.

In the double-action friction stir welding device 50A according to the present embodiment 1, the welding tool 51 is cleaned by the operator. However, the present invention is not limited thereto. For example, the control unit 21 may drive the tool drive unit 53 to cause the pin member 11 to project/retract relative to the shoulder member 12, thereby cleaning the welding tool 51. In this case, the control unit 21 may execute the welding tool cleaning method disclosed in PTL 1.

Embodiment 2

Figure 7:
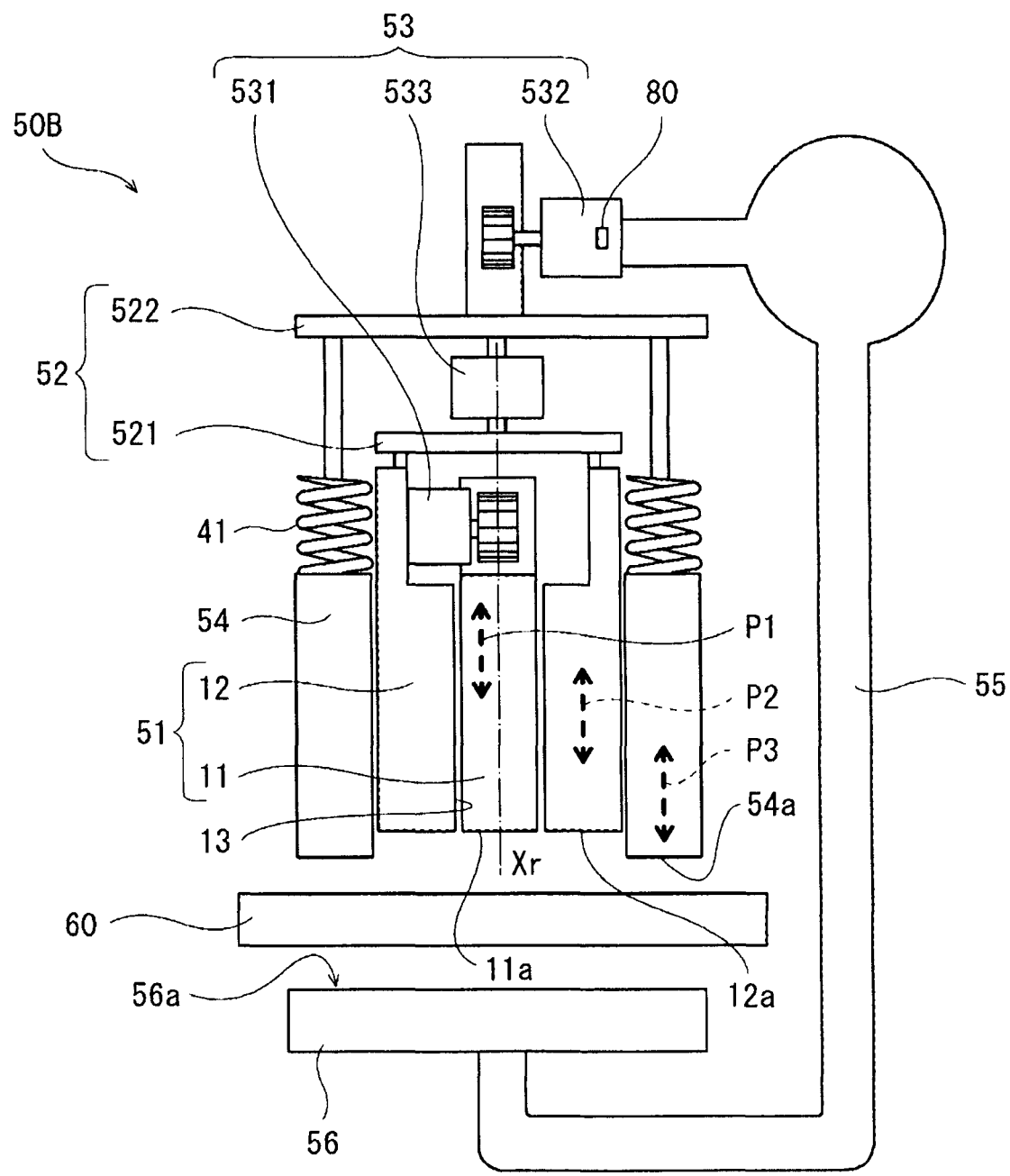
FIG. 7 is a side view schematically showing the hardware configuration of a double-action friction stir welding device according to embodiment 2.
Figure 8:
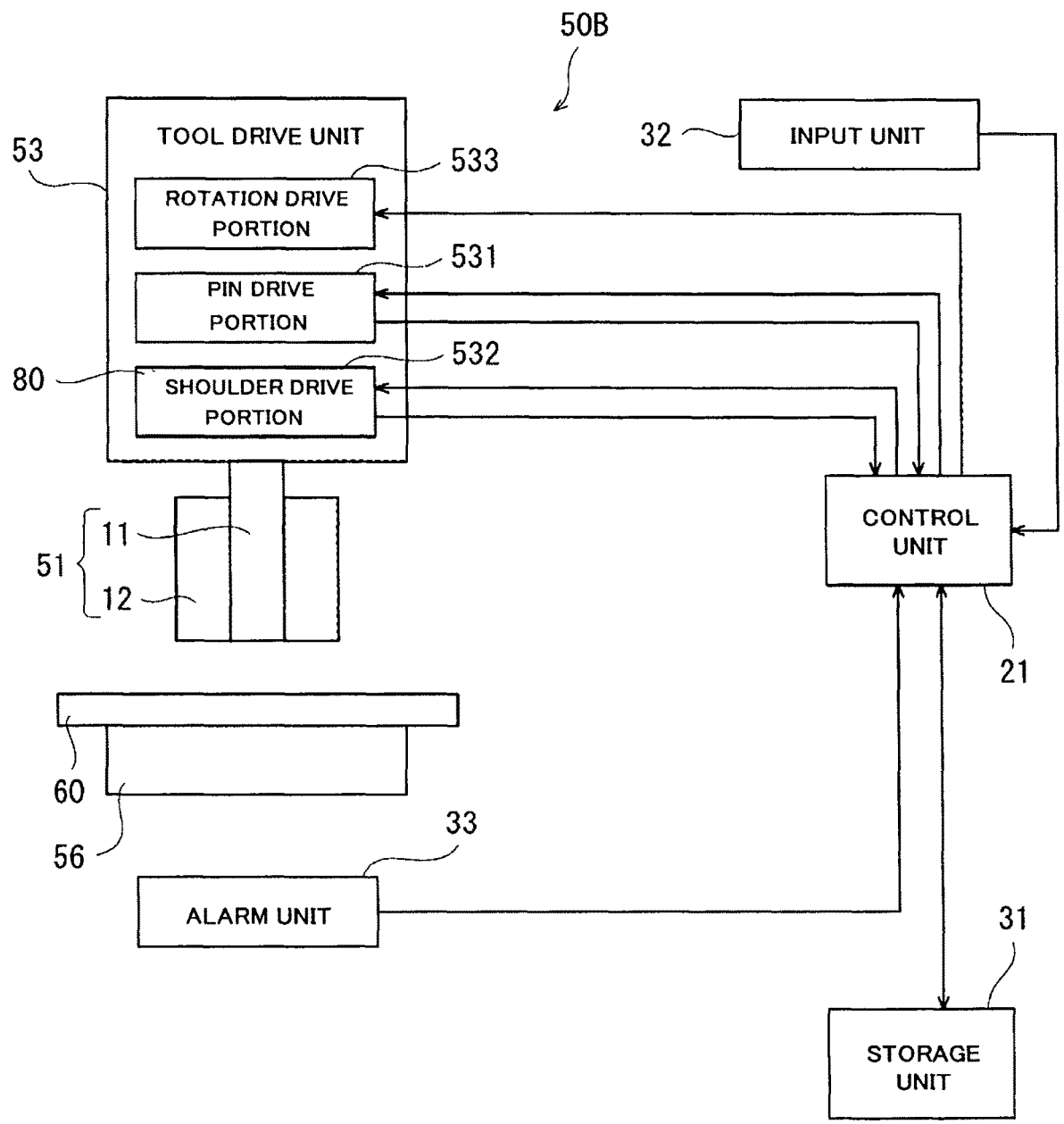
FIG. 8 is a block diagram showing the configuration of a control system of the double-action friction stir welding device shown in FIG. 7.

FIG. 7 is a side view schematically showing the hardware configuration of a double-action friction stir welding device according to the present embodiment 2. FIG. 8 is a block diagram showing the configuration of a control system of the double-action friction stir welding device shown in FIG. 7. The present embodiment 2 is different from embodiment 1 in that the adhesion parameter is the welding count (the number of times the friction stir welding is performed), and the other matters are the same as in embodiment 1. Hereinafter, the difference will be described.

With reference to FIG. 7 and FIG. 8, in a double-action friction stir welding device 50B of embodiment 2, the servomotor (not shown) of the shoulder drive portion 532 is provided with a rotary encoder 80, and an output signal therefrom is inputted to the control unit 21. The motor of the shoulder drive portion 532 causes the welding tool 51 to be advanced and retracted (lowered and lifted) one time per one operation of friction stir welding. Therefore, the control unit 21 counts the number of welding operations (the number of times of friction stir welding) on the basis of output from the rotary encoder 80. In this way, the control unit 21 monitors the welding count as the adhesion parameter, and performs the same alarm control as in embodiment 1. However, in the present embodiment 2, at the time when the level of the adhesion parameter (welding count) exceeds the second threshold, the welding tool 51 (double-action friction stir welding device 50B) has been stopped. Therefore, when the level of the adhesion parameter (welding count) exceeds the second threshold, the double-action friction stir welding device 50B is not started. Thus, operation of the welding tool 51 is prohibited.

The present embodiment 2 also provides the same effects as in embodiment 1.

Embodiment 3

Figure 9:
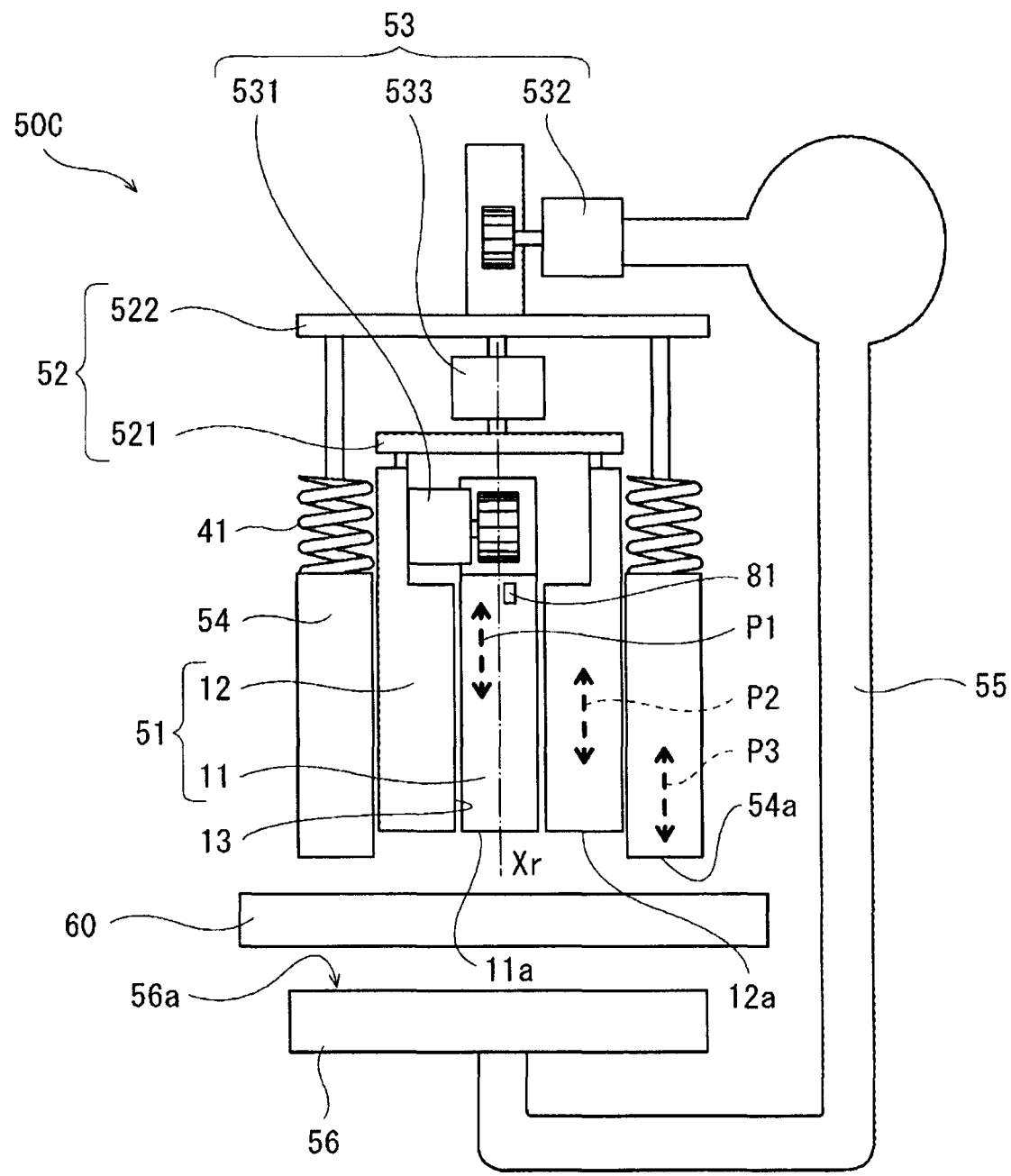
FIG. 9 is a side view schematically showing the hardware configuration of a double-action friction stir welding device according to embodiment 3.
Figure 10:
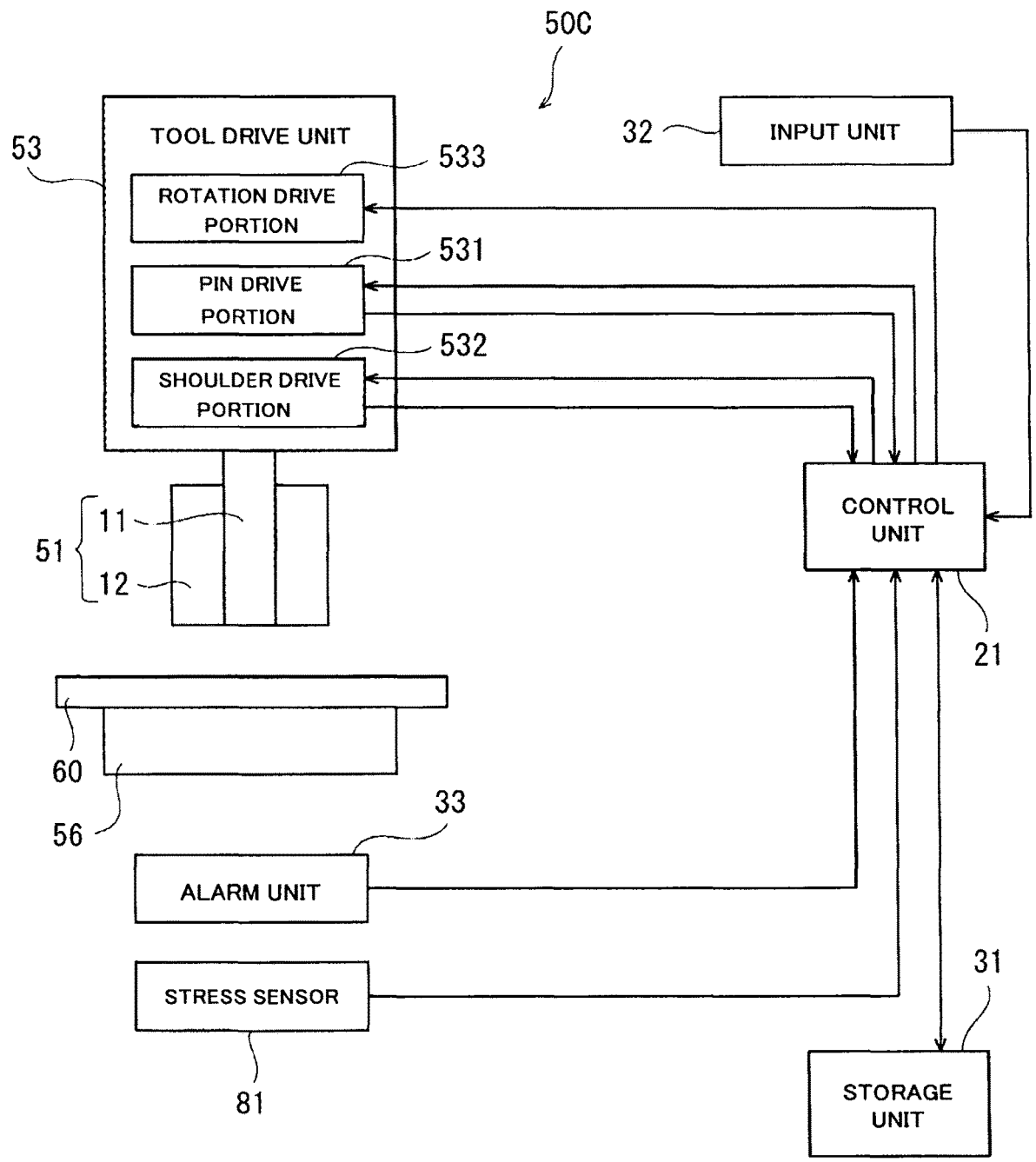
FIG. 10 is a block diagram showing the configuration of a control system of the double-action friction stir welding device shown in FIG. 9.

FIG. 9 is a side view schematically showing the hardware configuration of a double-action friction stir welding device according to the present embodiment 3. FIG. 10 is a block diagram showing the configuration of a control system of the double-action friction stir welding device shown in FIG. 9. The present embodiment 3 is different from embodiment 1 in that the adhesion parameter is stress occurring in the pin member 11, and the other matters are the same as in embodiment 1. Hereinafter, the difference will be described.

With reference to FIG. 9 and FIG. 10, in a double-action friction stir welding device 50C of embodiment 3, a stress sensor 81 is attached to the pin member 11, and an output signal therefrom is inputted to the control unit 21. The stress sensor 81 is, for example, a strain gauge. The output signal from the stress sensor 81 is, for example, transmitted via a signal line on the rotary body 521, transmitted between the rotary body 521 and the movable body 522 via a slip ring provided to the rotation shaft of the motor of the rotation drive portion 533 and a brush provided to the movable body 522, and then transmitted between the brush and the control unit 21 via a signal line. On the basis of the output from the stress sensor 81, the control unit 21 detects stress occurring in the pin member 11. Thus, the control unit 21 monitors stress occurring in the pin member 11, as the adhesion parameter, and performs alarming and stop control for the welding tool as in embodiment 1. The stress sensor may be provided to a member for transmitting a drive force to the pin member 11, and thereby stress occurring in the pin member 11 may be detected indirectly. The stress sensor 81 may be attached to the shoulder member 12, instead of the pin member 11.

The present embodiment 3 also provides the same effects as in embodiment 1.

Embodiment 4

The present embodiment 4 is different from embodiment 1 in that the control unit 21 performs alarming and prohibition of operation of the welding tool when the amount of increase in the adhesion parameter per predetermined period becomes equal to or greater than a predetermined value. The other matters are the same as in embodiment 1.

In the present embodiment 3, when the adhesion parameter exhibits a tendency of increasing beyond the allowable limit, alarming and stopping of the welding tool 5 are performed. Therefore, by setting the predetermined value as appropriate, it is possible to favorably suppress breakage of the welding tool 51 in the case where the material of the welding object 60 has such characteristics that the adhesion amount thereof on the welding tool 51 sharply increases as the number of times of friction stir welding increases.

Embodiment 5

In the present embodiment 5, the double-action friction stir welding device includes a cleaning mechanism, and cleaning of the welding tool 51 is automatically performed by the cleaning mechanism at predetermined timings. The predetermined timings include one or more specific timings, irregular timings, and regular timings.

The present embodiment 5 can prolong the life of the welding tool 51.

Embodiment 6

In the present embodiment 6, at least one of warning, prohibition of operation of the welding tool, and cleaning of the welding tool is performed at predetermined timings by the operator or the double-action friction stir welding device. The predetermined timings include one or more specific timings, irregular timings, and regular timings.

The present embodiment 6 can prolong the life of the welding tool 51.

Embodiment 7

A double-action friction stir welding device according to the present embodiment 7 is configured such that, in the double-action friction stir welding device according to any of embodiments 1 to 6, a first member is located so as to be opposed to the welding tool and is made of a material different from the second member, and in operation (A), the controller executes operation (A1) of operating the rotation mechanism and the advancing/retracting mechanism so as to cause the welding tool to press a welding target portion of a welding object while rotating the welding tool, operation (A2) of operating the projection/retraction mechanism so as to cause the head end of the welding tool to reach a predetermined first position so that the softened second member is thrusted into the softened first member, and operation (A3) of operating the projection/retraction mechanism, the rotation mechanism, and the advancing/retracting mechanism so as to pull out the welding tool from the welding target portion while rotating the welding tool.

In the double-action friction stir welding device according to the present embodiment 7, in the operation (A2), the controller may execute operation (A21) of operating the projection/retraction mechanism so as to retract the pin member into the shoulder member and cause the head end of the shoulder member to reach the first position, and after the operation (A21), execute operation (A22) of operating the projection/retraction mechanism so as to retract the head end of the shoulder member from the first position and cause the pin member to project from the head end of the shoulder member.

In the double-action friction stir welding device according to the present embodiment 7, the first member may be made of a material having a lower softening temperature than that of the second member.

In the double-action friction stir welding device according to the present embodiment 7, the first member may be made of at least one of aluminum, a thermoplastic plastic, and a fiber-reinforced plastic, and the second member is made of steel.

Hereinafter, an example of the double-action friction stir welding device according to the present embodiment 7 will be described with reference to FIG. 11 to FIG. 14B.

[Configuration of Double-Action Friction Stir Welding Device]

Figure 11:
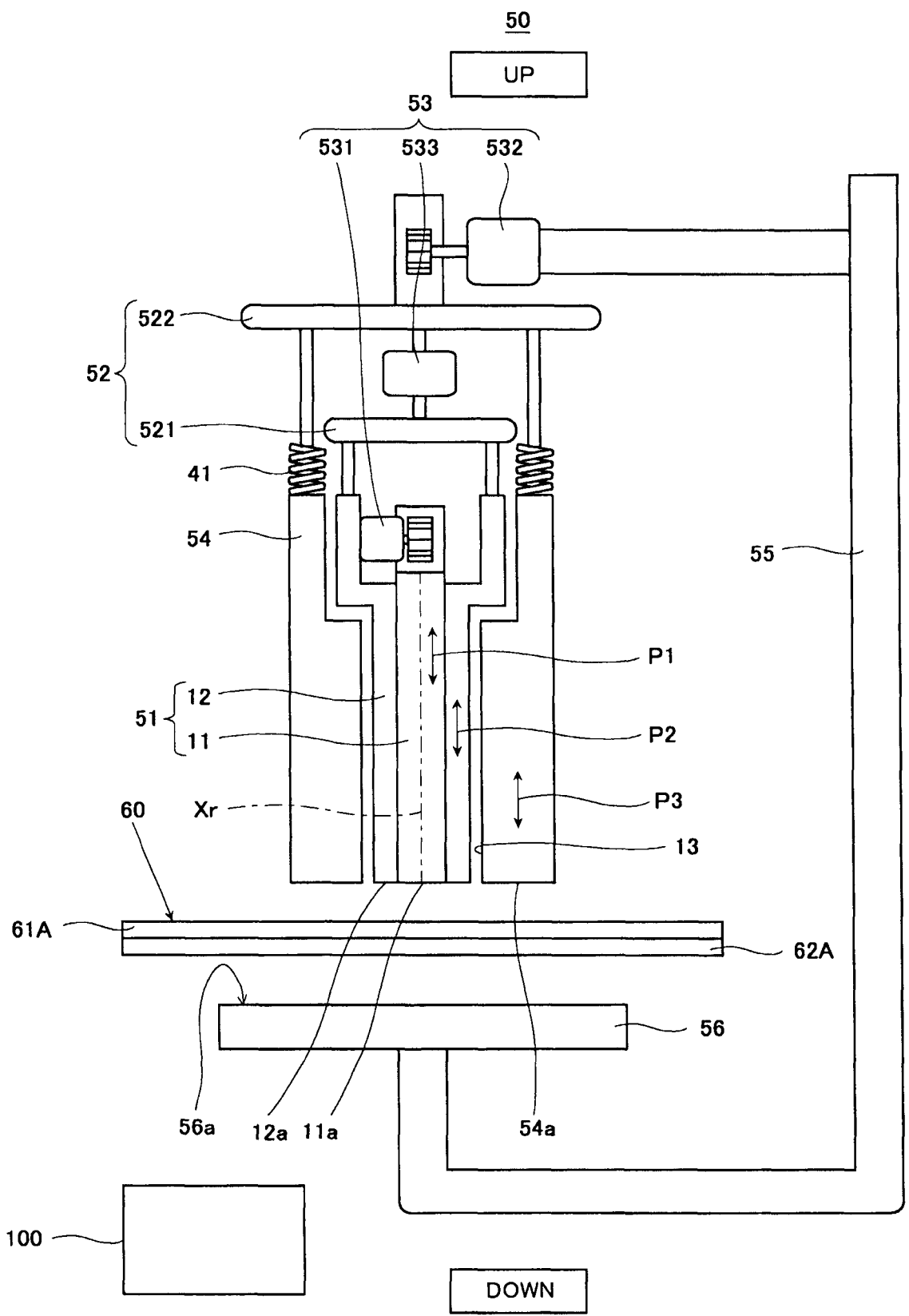
FIG. 11 is a diagram schematically showing the configuration of a double-action friction stir welding device according to embodiment 7.

FIG. 11 is a diagram schematically showing the configuration of the double-action friction stir welding device according to the present embodiment 7. In FIG. 11, the up-down direction in the drawing is indicated as the up-down direction of the double-action friction stir welding device.

As shown in FIG. 11, a double-action friction stir welding device 50 according to the present embodiment 7 includes the welding tool 51 including the pin member 11 and the shoulder member 12, the welding tool fixing portion 52, the tool drive unit 53, the clamp member 54, the C-shaped frame 55, the back contact member 56, and a controller 100.

The pin member 11 and the shoulder member 12 are supported by the welding tool fixing portion 52, and are driven to advance/retract in the up-down direction by the tool drive unit 53. The pin member 11, the shoulder member 12, the welding tool fixing portion 52, the tool drive unit 53, and the clamp member 54 are provided to the upper part of the C-shaped frame 55. The back contact member 56 is provided to the lower part of the C-shaped frame 55. The pin member 11 and the shoulder member 12, and the back contact member 56, are attached to the C-shaped frame 55, at positions opposed to each other. The welding object 60 is located between the back contact member 56, and the pin member 11 and the shoulder member 12.

The welding tool fixing portion 52 includes the rotary body 521 and the movable body 522, and the tool drive unit 53 includes the pin drive portion 531, the shoulder drive portion 532, and the clamp drive portion 41. The clamp member 54 is fixed to the movable body 522 via the clamp drive portion 41. The clamp drive portion 41 is formed of a spring.

The pin member 11 is formed substantially in a cylindrical shape or a columnar shape, and is supported by the rotary body 521, although not specifically shown in FIG. 11. The pin member 11 is configured to rotate about the axis Xr which coincides with the axis (center axis) of the pin member 11, by the rotation drive portion 533.

Further, the pin member 11 is able to advance/retract relative to the shoulder member 12 along the direction of the arrow P1, i.e., the direction of the axis Xr (in FIG. 11, the up-down direction) by the pin drive portion 531. That is, the pin drive portion 531 forms a projection/retraction mechanism for causing the pin member 11 to project/retract relative to the shoulder member 12. The pin drive portion 531 may be formed of a linear motion actuator, for example. The linear motion actuator may be formed of a servomotor and a rack and pinion, or a servomotor and a ball screw.

The shoulder member 12 is formed substantially in a cylindrical shape having a hollow, and is supported by the rotary body 521. The pin member 11 is inserted into the hollow of the shoulder member 12. In other words, the shoulder member 12 is provided so as to surround the outer circumferential surface of the pin member 11. The shoulder member 12 is configured to rotate about the same axis Xr as the pin member 11 by the rotation drive portion 533. Further, the shoulder member 12 is able to advance/retract along the direction of the arrow P2, i.e., the direction of the axis Xr by the shoulder drive portion 532.

The shoulder drive portion 532 may be formed of a linear motion actuator, for example. The linear motion actuator may be formed of a servomotor and a rack and pinion, or a servomotor and a ball screw.

As described above, in the present embodiment, the pin member 11 and the shoulder member 12 are both supported by the same rotary body 521, and are both rotated integrally about the axis Xr by the rotation drive portion 533. Thus, the rotation drive portion 533 and the rotary body 521 form a rotation mechanism for rotating the welding tool 51 about the center axis of the pin member 11.

The rotary body 521 is supported by the movable body 522 via the rotation drive portion 533. Thus, through driving by the shoulder drive portion 532, the pin member 11 and the movable body 522 advance/retract together with the shoulder member 12. Thus, the shoulder drive portion 532 and the movable body 522 form an advancing/retracting mechanism for advancing/retracting the welding tool 51 in the extending direction of the center axis of the pin member 11.

As in the shoulder member 12, the clamp member 54 is formed in a cylindrical shape having a hollow, and is provided such that the axis thereof coincides with the axis Xr. The shoulder member 12 is inserted into the hollow of the clamp member 54.

That is, the substantially cylindrical shoulder member 12 is provided so as to surround the outer circumferential surface of the pin member 11, and the substantially cylindrical clamp member 54 is provided so as to surround the outer circumferential surface of the shoulder member 12. In other words, the clamp member 54, the shoulder member 12, and the pin member 11 have a nested structure so as to be coaxial with each other.

The clamp member 54 is configured to press one surface (front surface) of the welding object 60. As described above, in the present embodiment 1, the clamp member 54 is supported by the movable body 522 via the clamp drive portion 41. The clamp drive portion 41 is configured to press the clamp member 54 toward the back contact member 56 side. Further, the clamp member 54 (including the clamp drive portion 41 and the movable body 522) is able to advance/retract in the direction of the arrow P3 (the same direction as arrows P1 and P2) by the shoulder drive portion 532.

In the present embodiment 1, the clamp drive portion 41 is formed of a spring, but is not limited thereto. The clamp drive portion 41 is only required to give an energizing force or a pressing force to the clamp member 54, and as the clamp drive portion 41, a mechanism using gas pressure, hydraulic pressure, a servomotor, or the like is also favorably applicable.

The pin member 11, the shoulder member 12, and the clamp member 54 have the lower end surface (head end surface) 11a, the lower end surface (head end surface) 12a, and the lower end surface (head end surface) 54a, respectively. Through advancing/retracting movements of the pin member 11, the shoulder member 12, and the clamp member 54 by the tool drive unit 53, the lower end surface 11a, the lower end surface 12a, and the lower end surface 54a come into contact with the front surface of the welding object 60.

In the present embodiment 7, the back contact member 56 has a flat surface (support surface 56a) to come into contact with the back surface of a planar welding object 60 so as to support the welding object 60. The configuration of the back contact member 56 is not particularly limited as long as the back contact member 56 can properly support the welding object 60 so as to allow friction stir welding to be performed. As the back contact member 56, for example, several back contact members 56 having different shapes may be prepared, and the back contact members 56 may be replaceable by being detached from the C-shaped frame 55 in accordance with the type of the welding object 60.

The specific configurations of the pin member 11, the shoulder member 12, the welding tool fixing portion 52, the tool drive unit 53, the clamp member 54, the C-shaped frame 55, and the back contact member 56 in the present embodiment 7 are not limited to the above configurations, and a wide variety of configurations known in the field of friction stir welding can be favorably used. For example, in the present embodiment, the pin drive portion 531 and the shoulder drive portion 532 forming the tool drive unit 53 are each formed of a motor and a gear mechanism, etc., which are known in the field of friction stir welding, but the pin drive portion 531 and the shoulder drive portion 532 are not limited thereto.

In the present embodiment 7, the configuration having the clamp member 54 is adopted. However, without limitation thereto, a configuration not having the clamp member 54 may be adopted. In this case, for example, the clamp member 54 may be configured to be detachable from the C-shaped frame 55 as necessary.

The double-action friction stir welding device 50 according to the present embodiment 7 is configured to be mounted to a friction stir welding robot device (not shown). Specifically, the C-shaped frame 55 is attached to the end of an arm of the robot.

The double-action friction stir welding device 50 (including the C-shaped frame 55) is not limited to application to a friction stir welding robot device. For example, the double-action friction stir welding device 50 is favorably applicable also to known working devices such as an NC working machine, a large-sized C frame, and an auto riveter.

The double-action friction stir welding device 50 according to the present embodiment 1 may be configured such that the back contact member 56 and the parts other than the back contact member 56 in the double-action friction stir welding device 50 are opposed to each other by two or more pairs of robots. Further, as long as the welding object 60 is stably subjected to friction stir welding, the double-action friction stir welding device 50 may be configured such that the welding object 60 is held by a hand or a robot is used as a positioner for the welding object 60.

[Control Configuration of Double-Action Friction Stir Welding Device]

Next, the control configuration of the double-action friction stir welding device 50 according to the present embodiment 7 will be specifically described with reference to FIG. 12.

Figure 12:
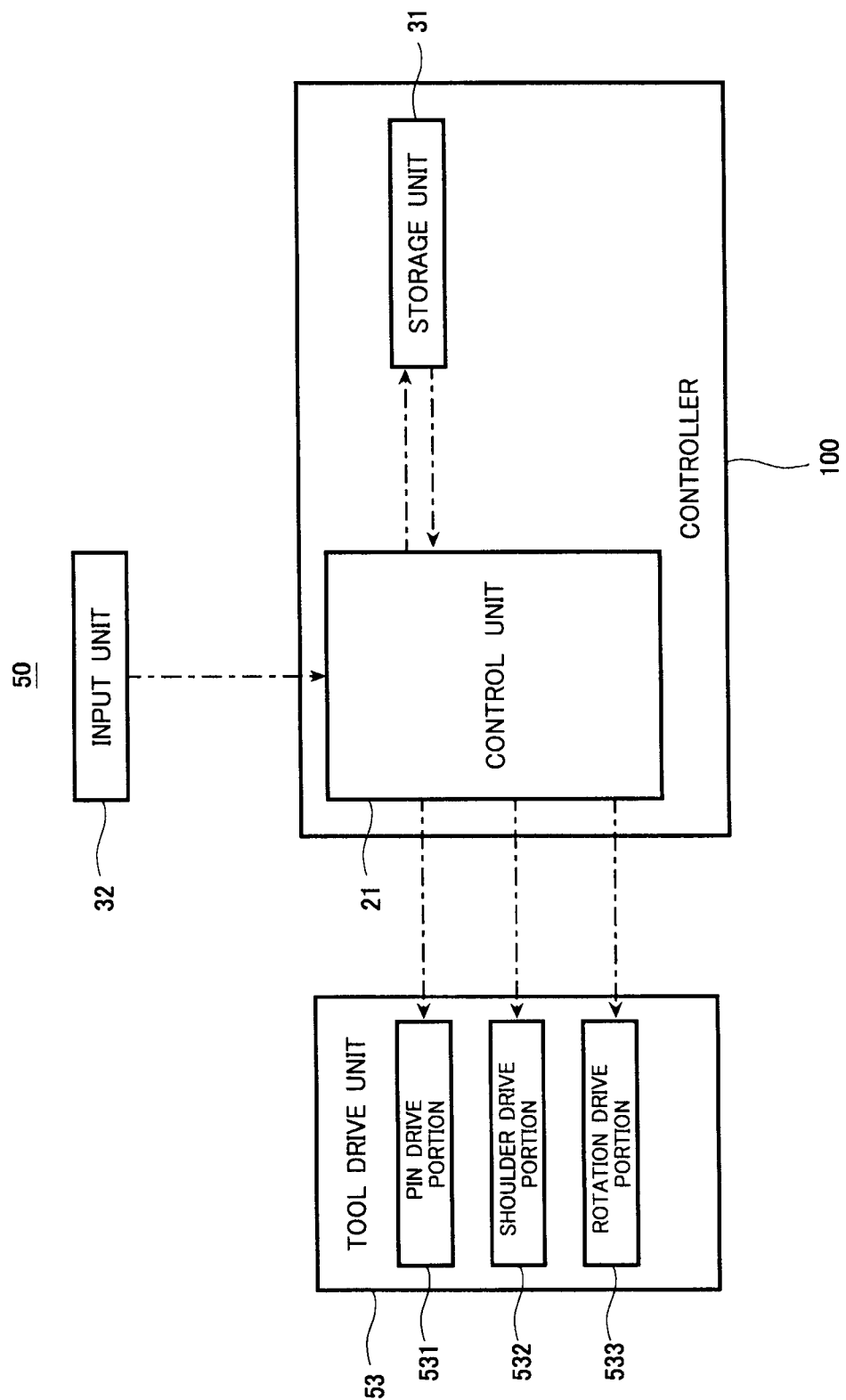
FIG. 12 is a block diagram schematically showing the control configuration of the double-action friction stir welding device shown in FIG. 11.

FIG. 12 is a block diagram schematically showing the control configuration of the double-action friction stir welding device shown in FIG. 11.

As shown in FIG. 12, the double-action friction stir welding device 50 includes the input unit 32 and the controller 100. The controller 100 includes the control unit (computation processing unit) 21 such as CPU, and the storage unit 31 such as ROM and RAM.

The input unit 32 allows various parameters relevant to friction stir welding control, other data, and the like to be inputted to the controller 100. The input unit 32 is formed of a known input device such as a keyboard, a touch panel, or a set of buttons and switches. In the present embodiment 7, at least the welding condition for the welding object 60, e.g., data such as the thickness and the material of the welding object 60, can be inputted via the input unit 32.

The storage unit 31 readably stores various data. The storage unit 31 is, for example, a known storage device such as a memory or a hard disk. The storage unit 31 need not be a single device, and may include a plurality of storage devices (e.g., random access memory and hard disk drive). In the case where the control unit 21 or the like is formed of a microcomputer, at least a part of the storage unit 31 may be formed as an internal memory of the microcomputer, or may be formed as an independent memory.

As a matter of course, the storage unit 31 may be configured to store data and allow the data to be read by something other than the control unit 21, or may be configured to allow data to be written therein from the control unit 21 or the like.

The control unit 21 is configured to control the members (devices) composing the double-action friction stir welding device 50. Specifically, the control unit 21 reads and executes a predetermined control program stored in the storage unit 31, to control the pin drive portion 531, the shoulder drive portion 532, and the rotation drive portion 533 which form the tool drive unit 53.

Thus, control of switching between advancing movement and retracting movement of the pin member 11 and the shoulder member 12, and control of head end positions, movement speeds, movement directions, and the like of the pin member 11 and the shoulder member 12 during advancing/retracting movement, can be performed. In addition, the pressing forces of the pin member 11, the shoulder member 12, and the clamp member 54 to press the welding object 60 can be controlled. Further, the rotation speeds of the pin member 11 and the shoulder member 12 can be controlled.

The controller 100 may be a single controller 100 that performs centralized control, or may be composed of a plurality of controllers 100 that cooperate with each other to perform decentralized control. The controller 100 may be formed of a microcomputer, or may be formed of an MPU, a programmable logic controller (PLC), a logic circuit, or the like.

[Operation of Double-Action Friction Stir Welding Device and Effects Thereof]

Next, operation of the double-action friction stir welding device according to the present embodiment 7 and effects thereof will be described with reference to FIG. 11 to FIG. 14B. The following operation is executed by the control unit 21 of the controller 100 reading a program stored in the storage unit 31.

Figure 13:
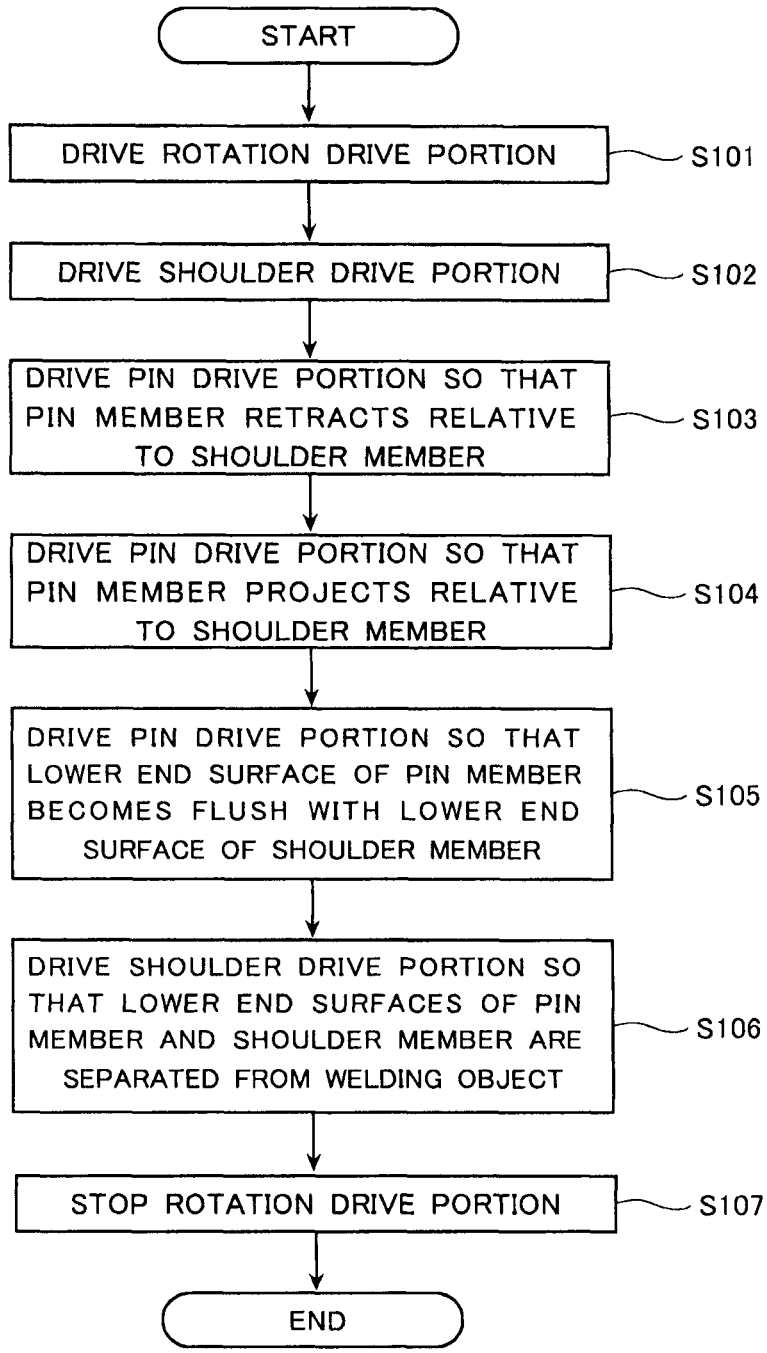
FIG. 13 is a flowchart showing an example of operation of the double-action friction stir welding device according to embodiment 7.
Figure 14A:
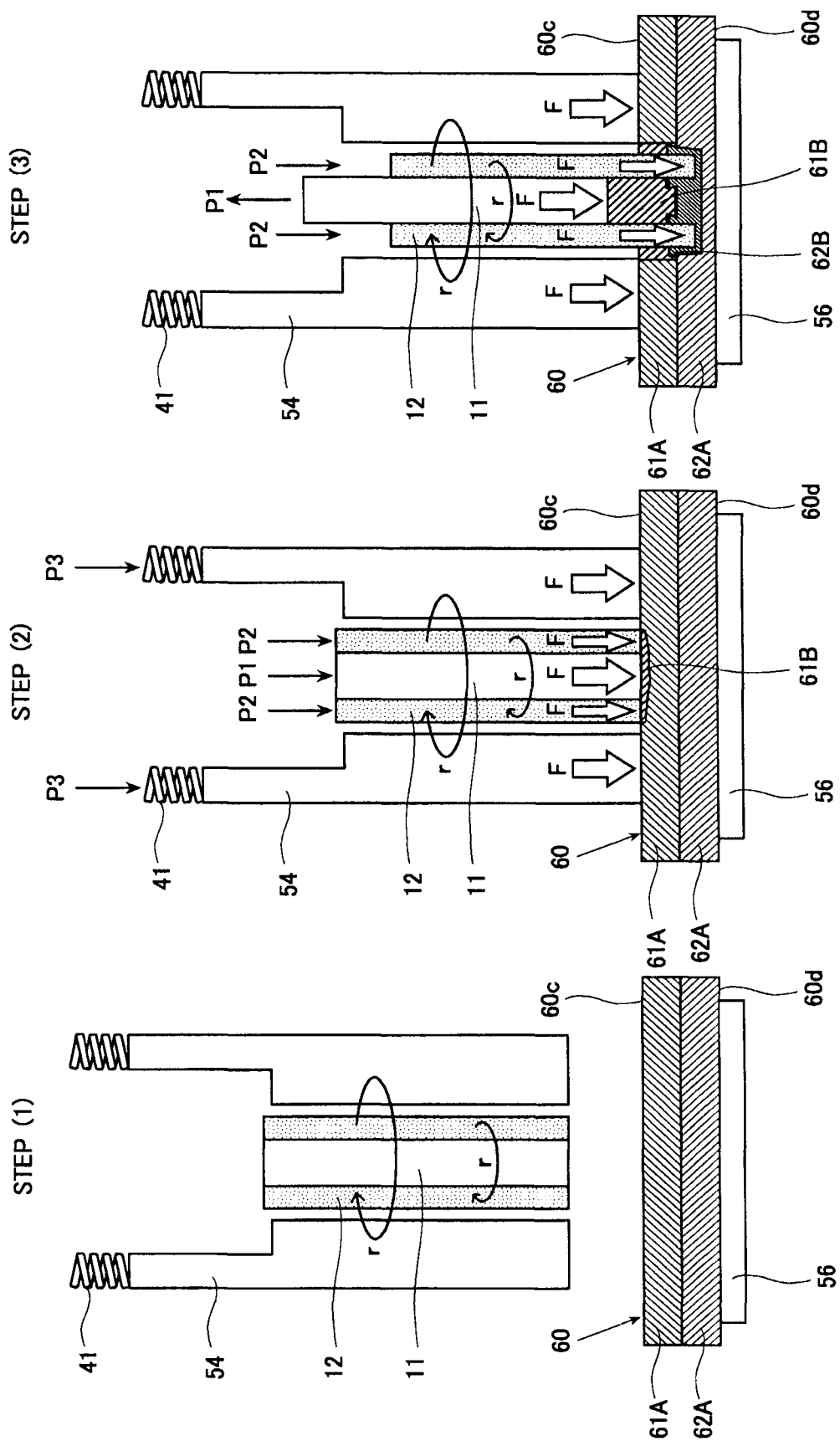
FIG. 14A schematically shows an example of steps in friction stir welding by the double-action friction stir welding device shown in FIG. 11.
Figure 14B:
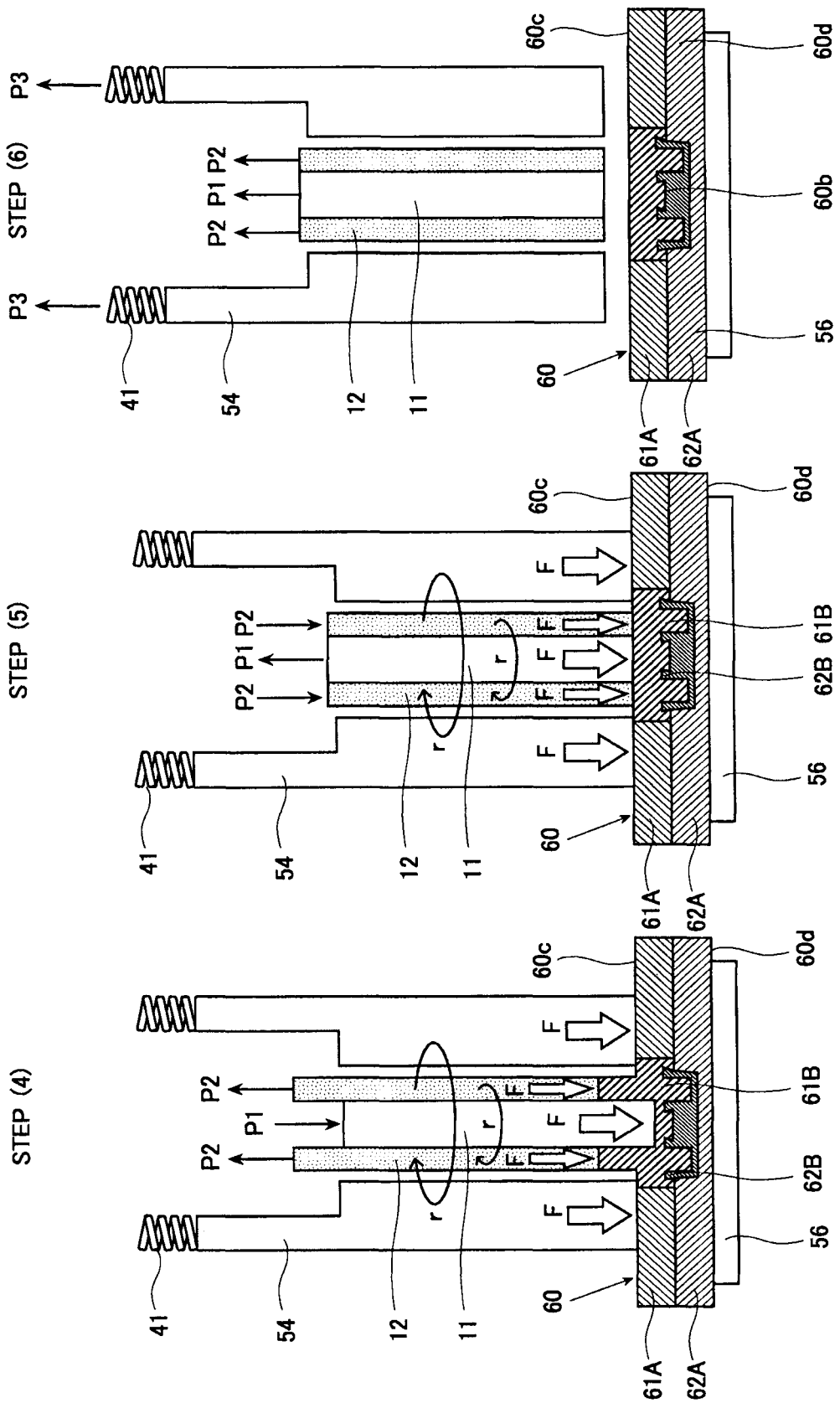
FIG. 14B schematically shows an example of steps in friction stir welding by the double-action friction stir welding device shown in FIG. 11.

FIG. 13 is a flowchart showing an example of operation of the double-action friction stir welding device according to the present embodiment 7. FIG. 14A and FIG. 14B schematically show an example of steps in friction stir welding by the double-action friction stir welding device shown in FIG. 11.

In FIG. 14A and FIG. 14B, the case where the welding object 60 is formed of two plate-shaped members, i.e., a first member 61A and a second member 62A, and these members are overlaid and joined by spot welding, is shown as an example. The first member 61A may be made of a material having a lower softening temperature than that of the second member 62A.

The first member 61A may be made of, for example, at least one of a metal material (e.g., aluminum), a thermoplastic plastic (e.g., polyamide), and a fiber-reinforced plastic (e.g., carbon fiber-reinforced plastic), and the second member 62A may be made of a metal material (e.g., steel or aluminum) different from the first member 61A.

In the present embodiment 7, the case where the welding object W is formed of a plate-shaped first member 61A and a plate-shaped second member 62A is shown. However, without limitation thereto, the welding object W (first member 61A and second member 62A) may have any shape, e.g., a rectangular parallelepiped shape or an arc shape.

In FIG. 14A and FIG. 14B, a part of the double-action friction stir welding device is not shown, arrows r indicate the rotation directions of the pin member 11 and the shoulder member 12, and block arrows F indicate the directions of forces applied to the first member 61A and the second member 62A.

Although force is also applied from the back contact member 56 to the first member 61A and the second member 62A, for convenience sake, this force is not shown in FIG. 14A and FIG. 14B. The shoulder member 12 is halftonehatched so as to be clearly distinguished from the pin member 11 and the clamp member 54.

First, the worker (operator) places the welding object W on the support surface 56a of the back contact member 56. Then, the worker operates the input unit 32 to make an input for causing the controller 100 to execute welding for the welding object W. The robot may place the welding object W on the support surface 56a of the back contact member 56.

Then, as shown in FIG. 13, the controller 100 drives the rotation drive portion 533 to rotate the pin member 11 and the shoulder member 12 at a predetermined rotation speed (e.g., 200 to 3000 rpm) (step S101; see step (1) in FIG. 14A). Next, the controller 100 drives the shoulder drive portion 532 to bring the pin member 11, the shoulder member 12, and the clamp member 54 close to the welding object 60 while the pin member 11 and the shoulder member 12 are rotating, so that the lower end surface 11a of the pin member 11, the lower end surface 12a of the shoulder member 12, and the lower end surface 54a of the clamp member 54 (not shown in FIG. 14A and FIG. 14B) come into contact with the front surface 60c of the welding object 60 (step S102; see step (2) in FIG. 14A).

At this time, the controller 100 controls the shoulder drive portion 532 so that the pin member 11, the shoulder member 12, and the clamp member 54 press the welding object 60 at a predetermined pressing force (e.g., a predetermined value in a range of 3 kN to 10 kN).

Thus, the first member 61A and the second member 62A are held between the clamp member 54 and the back contact member 56, and the clamp member 54 is pressed to the front surface 60c of the welding object 60 by compression of the clamp drive portion 41, whereby a clamping force is generated.

In this state, neither the pin member 11 nor the shoulder member 12 advances or retracts, and therefore the front surface 60c of the welding object 60 is to be "preliminarily heated". Thus, the material in the contact area of the first member 61A generates heat due to friction so as to soften, whereby a plastic-flow portion 61B of the first member 61A is formed near the front surface 60c of the welding object 60.

Next, the controller 100 drives the pin drive portion 531 so that the lower end surface 11a of the pin member 11 retracts relative to the lower end surface 12a of the shoulder member 12 (step S103). At this time, the controller 100 controls the pin drive portion 531 so that the head end of the shoulder member 12 reaches a predetermined first position. The position information about the head end of the shoulder member 12 is detected by a position detector (not shown), and is inputted to the controller 100.

Here, the first position is a position optionally set in a range greater than 0% and smaller than 100%, where the surface, of the second member 62A, that is in contact with the first member 61A is defined as 0%, and the surface, of the second member 62A, that is in contact with the support surface 56a of the back contact member 56 is defined as 100%. From the standpoint of improving the welding strength, the first position is desired to be close to the surface of the second member 62A that is in contact with the support surface 56a, and may be 25% or greater, 50% or greater, 75% or greater, 80% or greater, 90% or greater, or 95% or greater.

Thus, the head end of the shoulder member 12 is advanced (pressed) into the second member 62A from the front surface 60c of the welding object 60 (see step (3) in FIG. 14A), and a plastic-flow portion 62B is also formed in the second member 62A. At this time, the softened part of the second member 62A is pushed out by the head end of the shoulder member 12 so as to enter (be thrusted into) the softened part of the first member 61A.

Next, the controller 100 drives the pin drive portion 531 so that the lower end surface 11a of the pin member 11 projects relative to the lower end surface 12a of the shoulder member 12 (step S104). At this time, the controller 100 controls the pin drive portion 531 so that the head end of the pin member 11 reaches a predetermined second position. Here, the second position can be set in advance through an experiment or the like, and is appropriately set to be higher than the plastic-flow portion 62B that has entered the plastic-flow portion 61B.

Thus, the pin member 11 is gradually advanced (pressed) into the first member 61A and the shoulder member 12 is retracted from the first member 61A (see step (4) in FIG. 14B). At this time, the softened part of the plastic-flow portion 61B flows from an area directly under the pin member 11 to an area directly under the shoulder member 12, so that the recess formed by the shoulder member 12 being pressed is filled back.

Next, the controller 100 controls the pin drive portion 531 so that the lower end surface 11a of the pin member 11 and the lower end surface 12a of the shoulder member 12 become flush with each other on the front surface 60c of the welding object 60 (step S105; step (5) in FIG. 14B). Thus, the shape of the front surface 60c of the welding object 60 is arranged, whereby a substantially flat surface on which there are substantially no recesses is obtained.

Next, the controller 100 controls the shoulder drive portion 532 so that the lower end surface 11a of the pin member 11, the lower end surface 12a of the shoulder member 12, and the lower end surface 54a of the clamp member 54 are separated from the welding object 60 (step S106). Thereafter, the controller 100 controls the rotation drive portion 533 to stop rotation of the pin member 11 and the shoulder member 12 (step S107), and thus the series of steps in friction stir welding (process for welding the welding object 60) is finished (see step (6) in FIG. 14B).

Thus, rotation (and pressing) due to contact with the pin member 11 and the shoulder member 12 is no longer applied to the first member 61A and the second member 62A. Therefore, plastic flow of the plastic-flow portion 61B and the plastic-flow portion 62B stops, so that the plastic-flow portion 61B and the plastic-flow portion 62B become a welded portion 60b. Thus, two members, i.e., the first member 61A and the second member 62A are joined (welded) by the welded portion 60b.

In the double-action friction stir welding device 50 according to the present embodiment 7 configured as described above, when friction stir welding is performed on the welding object W, the softened part of the second member 62A enters the softened part of the first member 61A, thereby obtaining an anchor effect that the strength against tensile shear is enhanced and also the peeling resistance is relatively enhanced.

Therefore, in the double-action friction stir welding device 50 according to the present embodiment 7, even if a plurality of members (first member 61A, second member 62A) made of different materials are welded to each other using frictional heat, the welding strength can be enhanced.

In the double-action friction stir welding device 50 according to the present embodiment 7, friction stir welding is performed for two members (first member 61A, second member 62A) made of different materials. However, the present invention is not limited thereto. Friction stir welding may be performed for three or more members made of different materials.

[Modification 1]

Next, modification of the double-action friction stir welding device 50 according to the present embodiment 7 will be described with reference to FIG. 15, FIG. 16A, and FIG. 16B.

In a double-action friction stir welding device of Modification 1 according to the present embodiment 7, in operation (A2), the controller executes operation (A23) of operating the projection/retraction mechanism so as to cause the pin member to project from the head end of the shoulder member so that the head end of the pin member reaches the first position, and after the operation (A23), executes operation (A24) of operating the projection/retraction mechanism so as to retract the head end of the pin member into the shoulder member from the first position.

The double-action friction stir welding device of Modification 1 according to the present embodiment 7 has the same configuration as the double-action friction stir welding device according to embodiment 7, and therefore the detailed description is omitted.

[Operation of Double-Action Friction Stir Welding Device and Effects Thereof]

Figure 15:
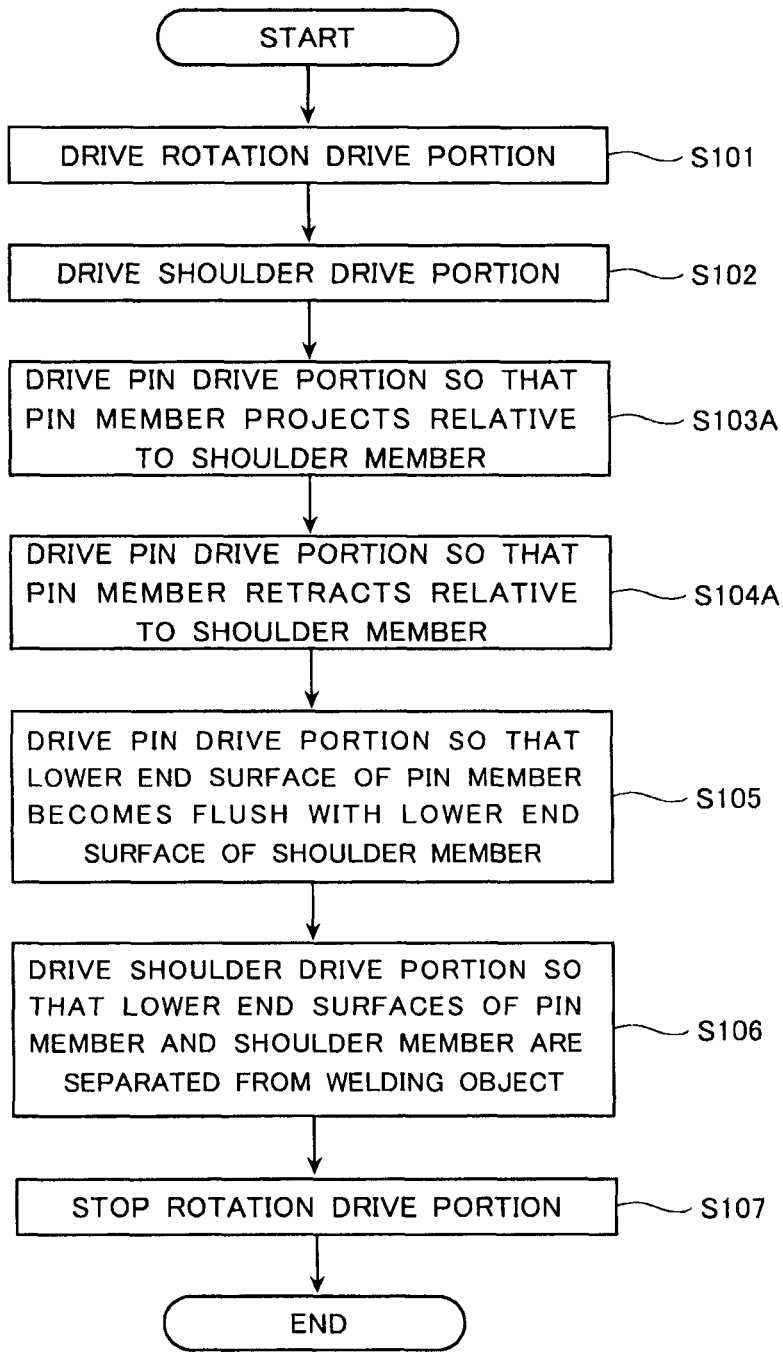
FIG. 15 is a flowchart showing an example of operation of a double-action friction stir welding device of Modification 1 according to embodiment 7.

FIG. 15 is a flowchart showing an example of operation of the double-action friction stir welding device of Modification 1 according to the present embodiment 7. FIG. 16A and FIG. 16B schematically show an example of steps in friction stir welding by the double-action friction stir welding device of Modification 1.

As shown in FIG. 15, operation of the double-action friction stir welding device 50 of Modification 1 is basically the same as operation of the double-action friction stir welding device 50 according to embodiment 7, but is different in that step S103A and step S104A are performed instead of step S103 and step S104.

Specifically, the controller 100 drives the pin drive portion 531 so that the lower end surface 11a of the pin member 11 projects relative to the lower end surface 12a of the shoulder member 12 (step S103A). At this time, the controller 100 controls the pin drive portion 531 so that the head end of the pin member 11 reaches the first position. The position information about the head end of the pin member 11 is detected by a position detector (not shown), and is inputted to the controller 100.

Figure 16A:
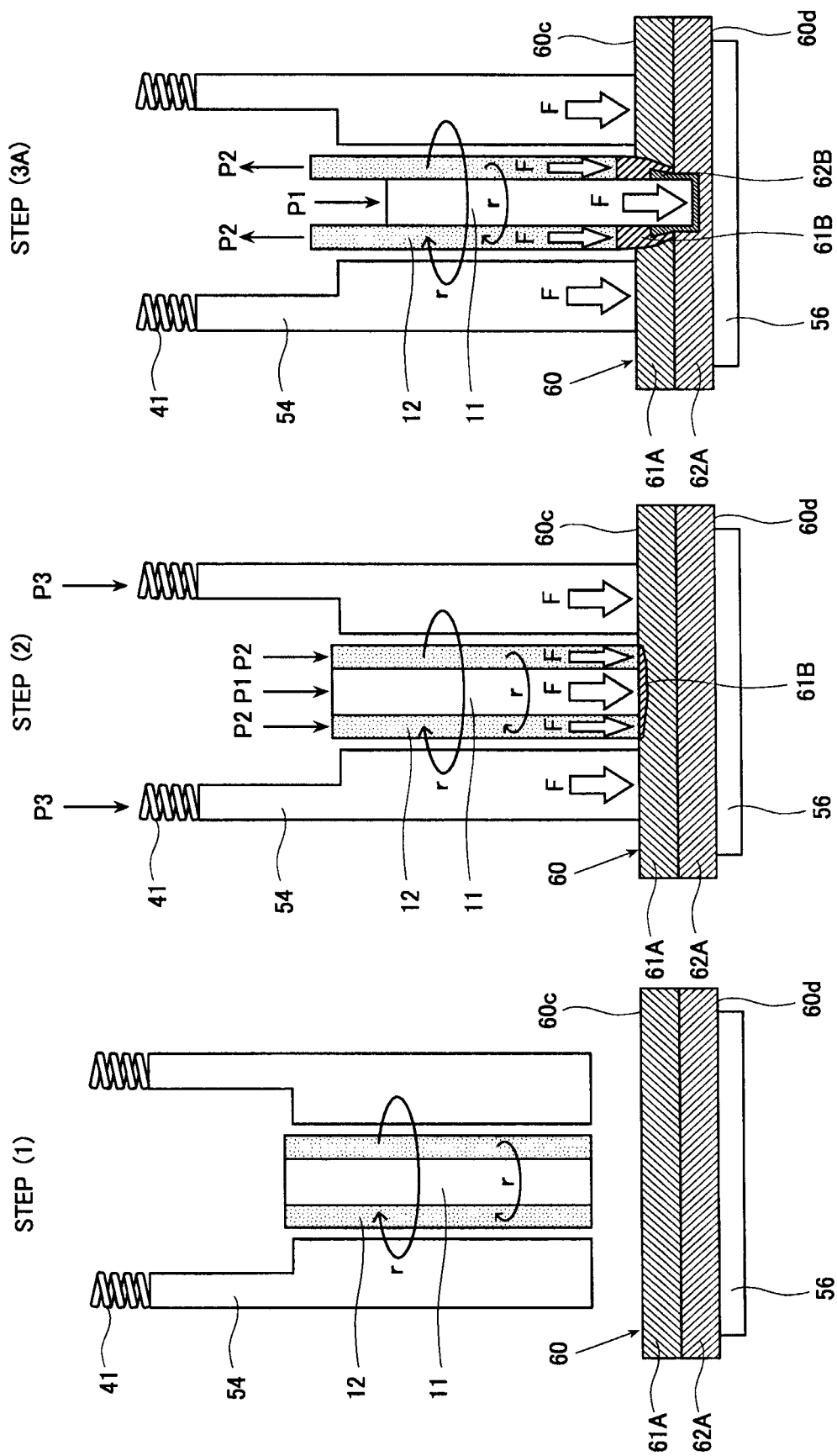
FIG. 16A schematically shows an example of steps in friction stir welding by the double-action friction stir welding device of Modification 1.

Thus, the head end of the pin member 11 is advanced (pressed) into the second member 62A from the front surface 60c of the welding object 60 (see step (3) in FIG. 16A), and a plastic-flow portion 62B is also formed in the second member 62A. At this time, the softened part of the second member 62A is pushed out by the head end of the pin member 11 so as to enter (be thrusted into) the softened part of the first member 61A.

Next, the controller 100 drives the pin drive portion 531 so that the lower end surface 11a of the pin member 11 retracts relative to the lower end surface 12a of the shoulder member 12 (step S104A). At this time, the controller 100 controls the pin drive portion 531 so that the head end of the shoulder member 12 reaches a predetermined second position.

Figure 16B:
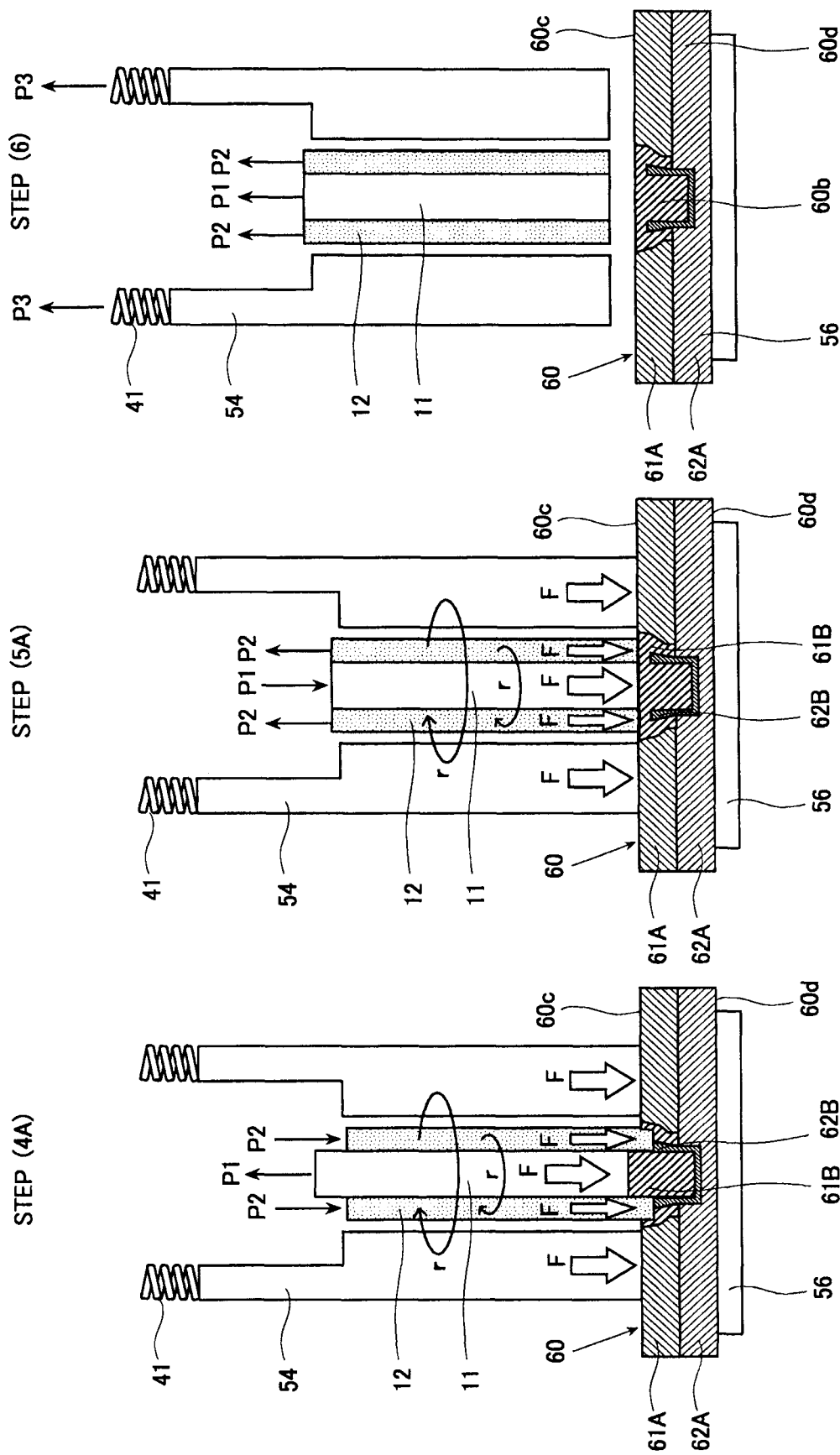
FIG. 16B schematically shows an example of steps in friction stir welding by the double-action friction stir welding device of Modification 1.

Thus, the shoulder member 12 is gradually advanced (pressed) into the first member 61A, and the pin member 11 is retracted from the first member 61A (see step (4) in FIG. 16B). At this time, the softened part of the plastic-flow portion 61B flows from an area directly under the shoulder member 12 to an area directly under the pin member 11, so that the recess formed by the pin member 11 being pressed is filled back.

Then, the controller 100 executes the processing in step S105 to step S107 as in the double-action friction stir welding device 50 according to embodiment 7, and thus the series of steps in friction stir welding (process for welding the welding object 60) is finished.

The double-action friction stir welding device 50 of Modification 1 configured as described above also provides the same effects as in the double-action friction stir welding device 50 according to embodiment 7.

Embodiment 8

A double-action friction stir welding device according to the present embodiment 8 is configured such that, in the double-action friction stir welding device according to embodiment 7, the controller further executes operation (D) of cleaning at least one of the outer circumferential surface of the pin member and the inner circumferential surface of the central through hole of the shoulder member on the basis of the level of the adhesion parameter correlated with the degree of adhesion of the material of the welding object, caused by friction stir welding, on the outer circumferential surface of the pin member and the inner circumferential surface of the central through hole of the shoulder member.

In the double-action friction stir welding device according to the present embodiment 8, the adhesion parameter may be the current value of the motor provided to the projection/retraction mechanism and configured to drive the pin member to project/retract relative to the shoulder member.

In the double-action friction stir welding device according to the present embodiment 8, the adhesion parameter may be the number of times of friction stir welding performed for the welding object.

Further, in the double-action friction stir welding device according to the present embodiment 8, the adhesion parameter may be stress occurring in the pin member and/or the shoulder member.

Hereinafter, an example of the double-action friction stir welding device according to the present embodiment 8 will be described with reference to FIG. 17 and FIG. 18.

[Configuration of Double-Action Friction Stir Welding Device]

Figure 17:
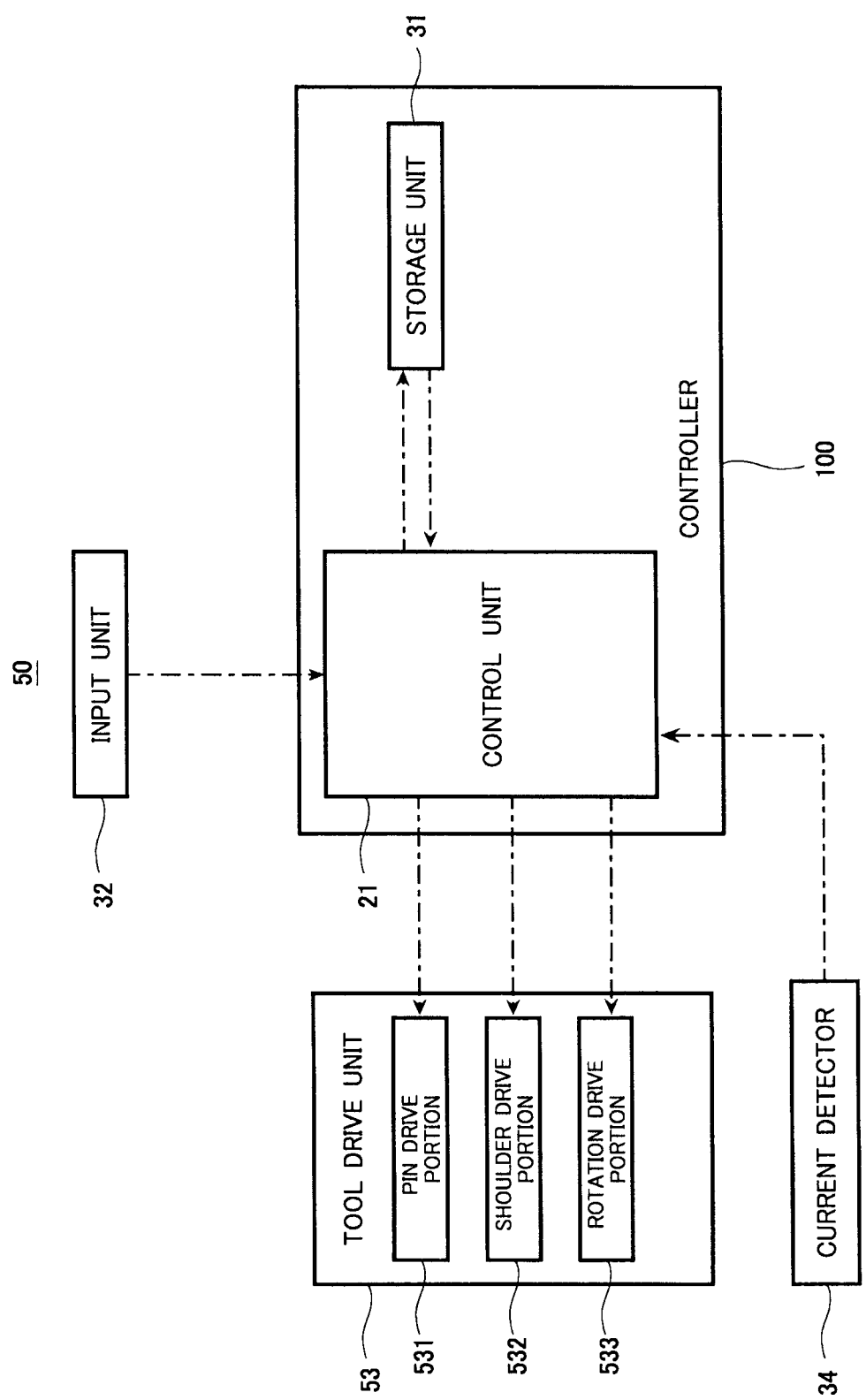
FIG. 17 is a block diagram showing the schematic configuration of a double-action friction stir welding device according to embodiment 8.

FIG. 17 is a block diagram showing the schematic configuration of the double-action friction stir welding device according to the present embodiment 8.

As shown in FIG. 17, the double-action friction stir welding device 50 according to the present embodiment 8 basically has the same configuration as the double-action friction stir welding device 50 according to embodiment 7, but is different in that a current detector 34 is further provided. The current detector 34 is configured to detect the current value of the servomotor forming the pin drive portion 531 and output the detected current value to the control unit 21 of the controller 100.

[Operation of Double-Action Friction Stir Welding Device and Effects Thereof]

Next, operation of the double-action friction stir welding device according to the present embodiment 8 and effects thereof will be described with reference to FIG. 17 and FIG. 18. The following operation is executed by the control unit 21 of the controller 100 reading a program stored in the storage unit 31 when the controller 100 executes friction stir welding operation.

Figure 18:
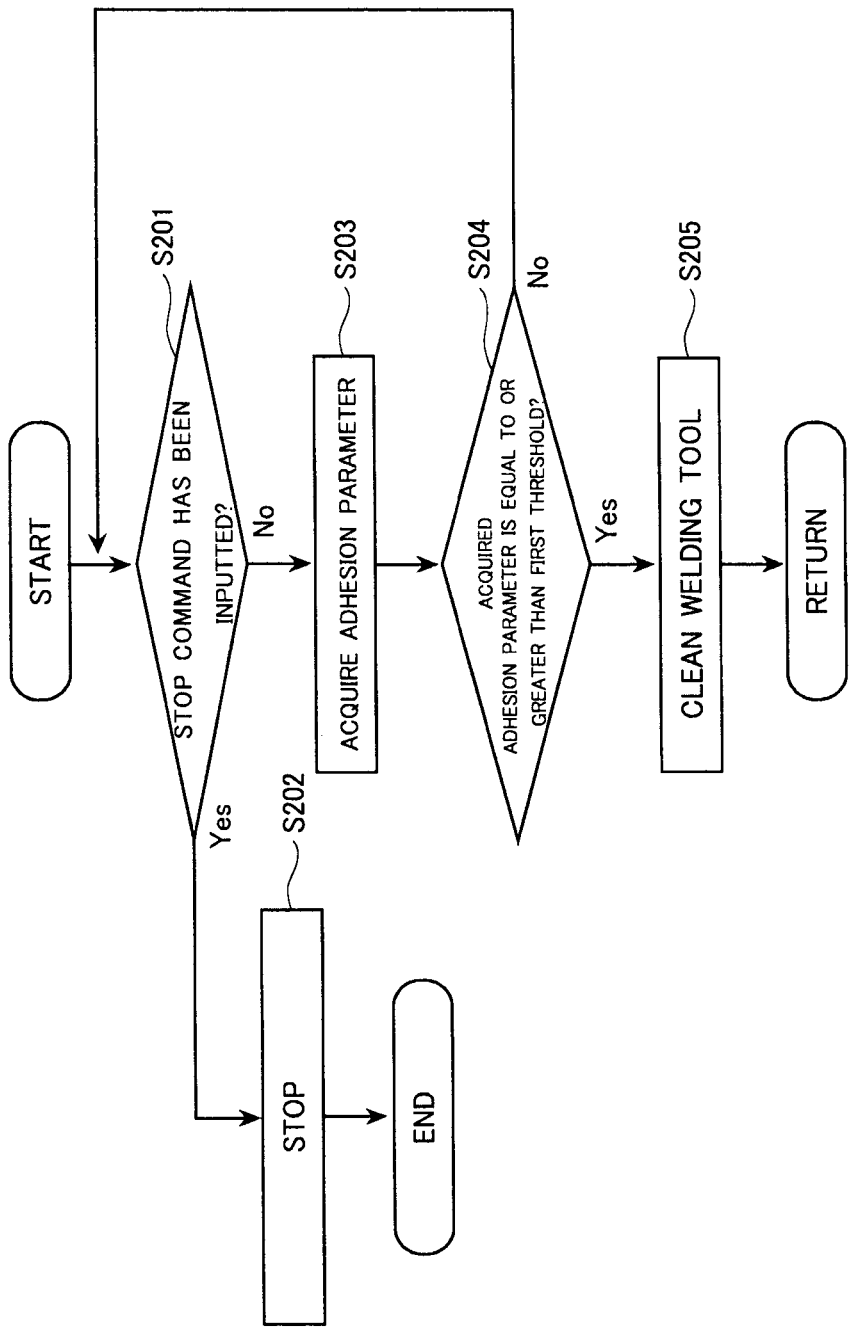
FIG. 18 is a flowchart showing an example of operation of the double-action friction stir welding device according to embodiment 8.

FIG. 18 is a flowchart showing an example of operation of the double-action friction stir welding device according to the present embodiment 8.

As shown in FIG. 18, the controller 100 determines whether or not a stop command for the double-action friction stir welding device 50 has been inputted via the input unit 32 from the operator (step S201).

If the controller 100 determines that the stop command for the double-action friction stir welding device 50 has been inputted via the input unit 32 from the operator (Yes in step S201), the controller 100 executes stop processing for the double-action friction stir welding device 50 (step S202), to end the present program.

In the stop processing for the double-action friction stir welding device 50, for example, the pin drive portion 531 and the shoulder drive portion 532 are controlled so as to move the pin member 11, the shoulder member 12, and the clamp member 54 to predetermined initial positions, and the rotation drive portion 533 is stopped.

If the controller 100 determines that the stop command for the double-action friction stir welding device 50 has not been inputted via the input unit 32 from the operator (No in step S201), the controller 100 acquires the adhesion parameter (step S203). Specifically, in the present embodiment 8, the controller 100 acquires the current value of the motor of the pin drive portion 531 detected by the current detector 34.

Here, the adhesion parameter is a parameter correlated with the degree of adhesion of the material of the welding object 60, caused by friction stir welding, on the outer circumferential surface of the pin member 11 and/or the inner circumferential surface of the central through hole 13 of the shoulder member 12. Examples of the adhesion parameter include the current value of the motor of the pin drive portion 531 for driving the pin member 11 to project/retract relative to the shoulder member 12, the welding count which is the number of times of friction stir welding, and stress occurring in the pin member 11 or the shoulder member 12. The absolute values of these parameters increase (the levels increase) as the amount of adhesion increases (the level increases). The signs of the motor current value and the stress are inverted between the two breakage patterns. Therefore, the level of the adhesion parameter is specified by the absolute value thereof.

The controller 100 may store the number of times friction stir welding has been executed, in the storage unit 31, and acquire the number of times of friction stir welding as the adhesion parameter. The controller 100 may acquire stress detected by a stress detector provided to the pin member 11 and/or the shoulder member 12, as the adhesion parameter. The stress detector may be a strain gauge.

Next, the controller 100 determines whether or not the adhesion parameter acquired in step S203 is equal to or greater than a first threshold (step S204). Here, the first threshold can be set in advance through an experiment or the like. In the case where the current value is used as the adhesion parameter, from the standpoint of suppressing breakage of the welding tool 51, the first threshold may be 3 A or 4 A, for example.

In the case where the number of times of friction stir welding is used as the adhesion parameter, the number of times the current value detected by the current detector 34 has become 3 A may be used, or the number of times the current value detected by the current detector 34 has become 4 A may be used. Similarly, in the case where stress is used as the adhesion parameter, stress detected by the stress detector when the current value detected by the current detector 34 has become 3 A may be used, or stress detected by the stress detector when the current value detected by the current detector 34 has become 4 A may be used.

If the controller 100 determines that the adhesion parameter acquired in step S203 is not equal to or greater than the first threshold (No in step S204), the controller 100 returns to step S201.

On the other hand, if the controller 100 determines that the adhesion parameter acquired in step S203 is equal to or greater than the first threshold (Yes in step S204), the controller 100 executes cleaning of the welding tool 51 (step S205), and then returns to step S201. Specifically, the controller 100 drives the shoulder drive portion 532 to cause the pin member 11 to project/retract relative to the shoulder member 12, thereby cleaning the welding tool 51. In this case, the controller 100 may execute the welding tool cleaning method disclosed in PTL 2.

In the double-action friction stir welding device 50 according to the present embodiment 8 configured as described above, the controller 100 further executes operation (D) of cleaning at least one of the outer circumferential surface of the pin member 11 and the inner circumferential surface of the central through hole of the shoulder member 12 on the basis of the level of the adhesion parameter correlated with the degree of adhesion of the material of the welding object 60, caused by friction stir welding, on the outer circumferential surface of the pin member 11 and the inner circumferential surface of the central through hole of the shoulder member 12.

Thus, the welding tool 51 can be cleaned before the welding tool 51 is broken, whereby the life of the welding tool 51 can be prolonged.

Embodiment 9

A double-action friction stir welding device according to the present embodiment 9 is configured such that, in the double-action friction stir welding device according to embodiment 7 and/or embodiment 8, in operation (D), the controller executes operation (D1) of performing warning by a notification device when the adhesion parameter is equal to or greater than a predetermined first threshold, and after the operation (D1), executes operation (D2) of cleaning at least one of the outer circumferential surface of the pin member and the inner circumferential surface of the central through hole of the shoulder member.

Hereinafter, an example of the double-action friction stir welding device according to the present embodiment 9 will be described with reference to FIG. 19 and FIG. 20.

[Configuration of Double-Action Friction Stir Welding Device]

Figure 19:
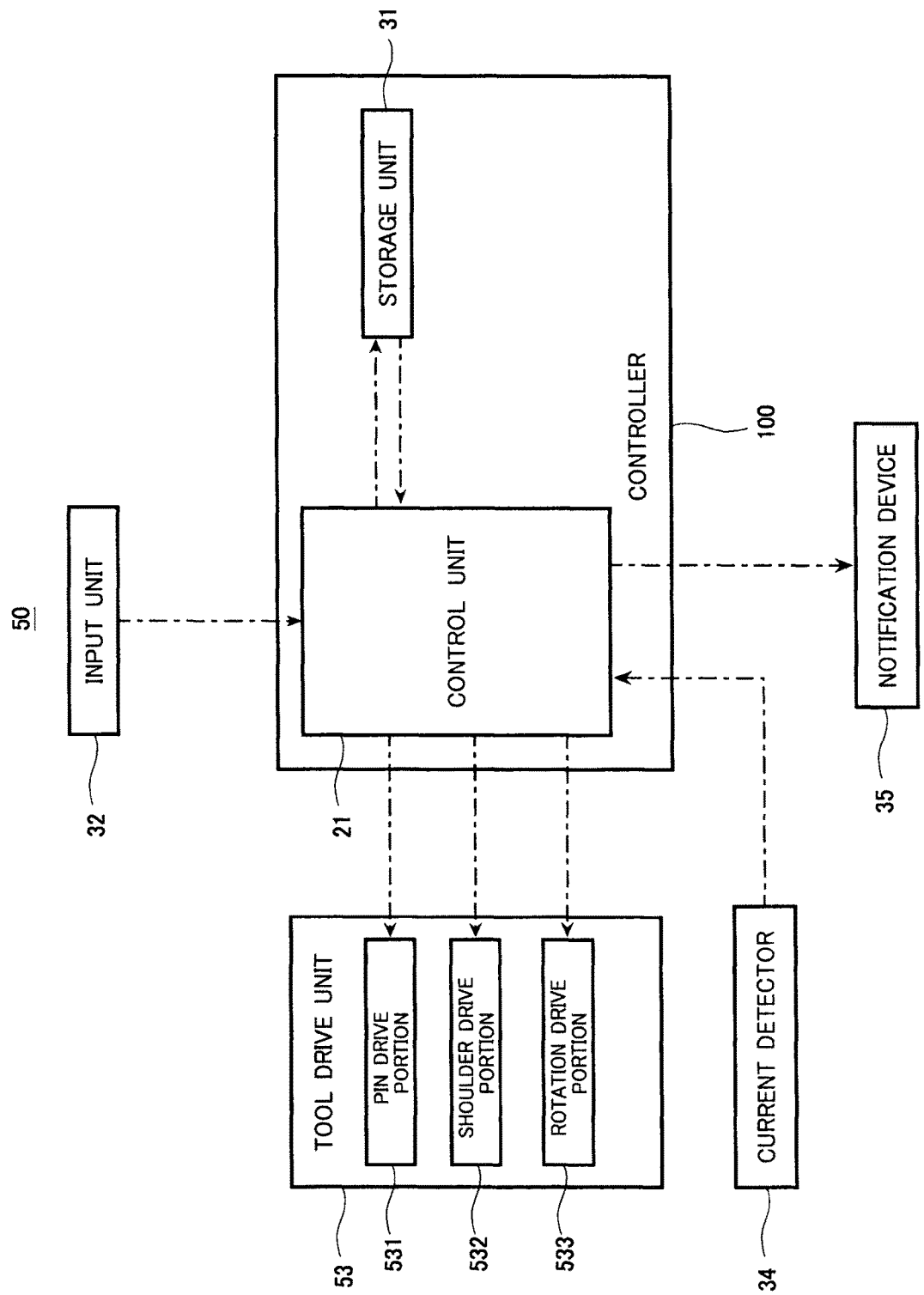
FIG. 19 is a block diagram showing the schematic configuration of a double-action friction stir welding device according to embodiment 9.

FIG. 19 is a block diagram schematically showing the double-action friction stir welding device according to the present embodiment 9.

As shown in FIG. 19, the double-action friction stir welding device 50 according to the present embodiment 9 basically has the same configuration as the double-action friction stir welding device 50 according to embodiment 8, but is different in that a notification device 35 is further provided. The notification device 35 notifies (warns) the operator that the adhesion parameter has reached a level at which caution for breakage of the welding tool 51 is required.

The notification device 35 may have any configuration as long as the notification device 35 can give a warning to outside. As an example of means for warning to outside, character data, image data, or the like may be displayed on a display portion (screen) of a remote controller, sound may be outputted by a loudspeaker or the like, or indication by light or color may be used. Further, such a notification may be given to a smartphone, a mobile phone, a tablet computer, or the like by an E-mail or an application via a communication network.

[Operation of Double-Action Friction Stir Welding Device and Effects Thereof]

Next, operation of the double-action friction stir welding device according to the present embodiment 9 and effects thereof will be described with reference to FIG. 19 and FIG. 20. The following operation is executed by the control unit 21 of the controller 100 reading a program stored in the storage unit 31 when the controller 100 executes friction stir welding operation.

Figure 20:
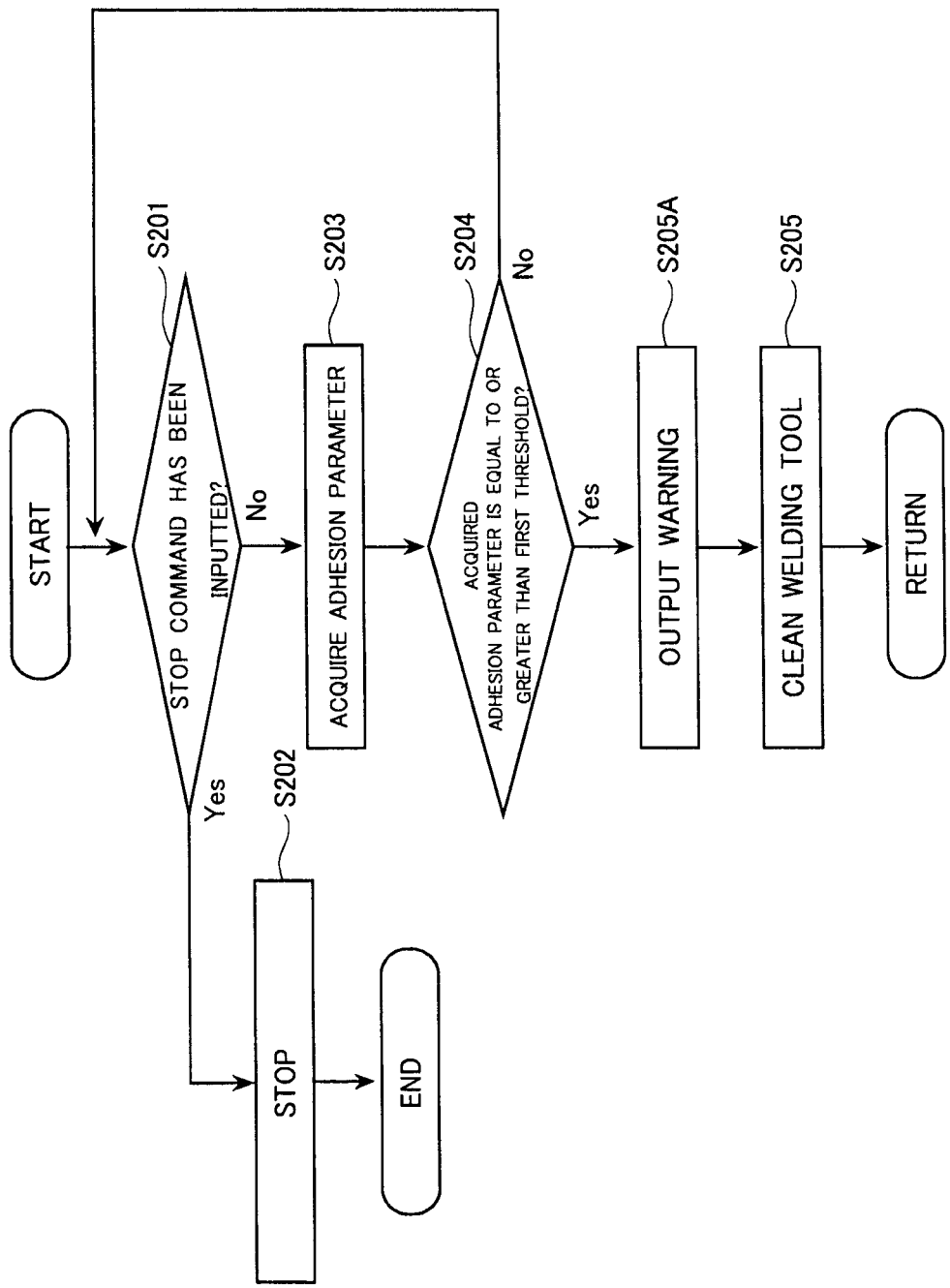
FIG. 20 is a flowchart showing an example of operation of the double-action friction stir welding device according to embodiment 9.

FIG. 20 is a flowchart showing an example of operation of the double-action friction stir welding device according to the present embodiment 9.

As shown in FIG. 20, operation of the double-action friction stir welding device 50 according to the present embodiment 9 is basically the same as operation of the double-action friction stir welding device 50 according to embodiment 8, but is different in that, if the controller 100 determines that the adhesion parameter acquired in step S203 is equal to or greater than the first threshold in step S204, the controller 100 executes step S205A and then executes step S205.

Specifically, if the controller 100 determines that the adhesion parameter acquired in step S203 is equal to or greater than the first threshold (Yes in step S204), the controller 100 causes the notification device 35 to output an alarm (step S205). Thus, the operator or the like can recognize that the level at which caution for breakage of the welding tool 51 is required is reached.

Next, the controller 100 executes cleaning of the welding tool 51 (step S205) and returns to step S201.

The double-action friction stir welding device 50 according to the present embodiment 9 configured as described above also provides the same effects as in the double-action friction stir welding device 50 according to embodiment 8.

In the double-action friction stir welding device 50 according to the present embodiment 9, the controller 100 performs warning by the notification device 35. Thus, the operator or the like can recognize that the level at which caution for breakage of the welding tool 51 is required is reached. Thus, the welding tool 51 can be cleaned before the welding tool 51 is broken, whereby the life of the welding tool 51 can be prolonged.

In the present embodiment 9, the controller 100 executes cleaning of the welding tool 51. However, without limitation thereto, the operator or the like notified that an alarm is outputted by the notification device 35 may execute cleaning of the welding tool 51.

Embodiment 10

The double-action friction stir welding device according to the present embodiment 10 is configured such that, in the double-action friction stir welding device according to any one of embodiments 7 to 9, in operation (D), the controller further executes operation (D3) of prohibiting the next welding operation for a welding object when the adhesion parameter is equal to or greater than a second threshold greater than the first threshold.

Hereinafter, an example of the double-action friction stir welding device according to the present embodiment 10 will be described with reference to FIG. 21. The double-action friction stir welding device according to the present embodiment 10 has the same configuration as the double-action friction stir welding device according to embodiment 8, and therefore the detailed description thereof is omitted.

[Operation of Double-Action Friction Stir Welding Device and Effects Thereof]

Figure 21:
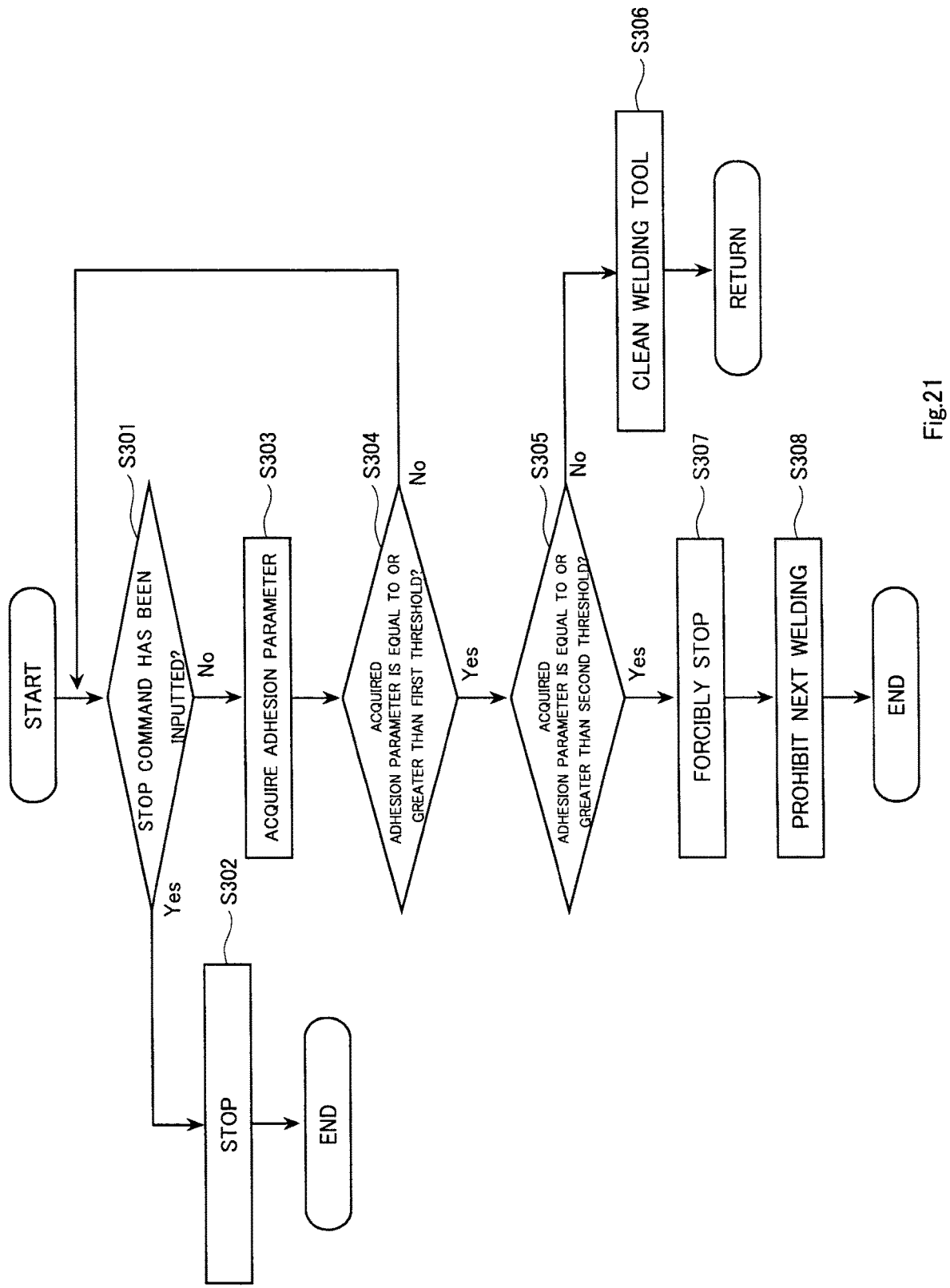
FIG. 21 is a flowchart showing an example of operation of a double-action friction stir welding device according to embodiment 10.

FIG. 21 is a flowchart showing an example of operation of the double-action friction stir welding device according to the present embodiment 10. The following operation is executed by the control unit 21 of the controller 100 reading a program stored in the storage unit 31 when the controller 100 executes friction stir welding operation.

As shown in FIG. 21, the controller 100 determines whether or not a stop command for the double-action friction stir welding device 50 has been inputted via the input unit 32 from the operator (step S301).

If the controller 100 determines that the stop command for the double-action friction stir welding device 50 has been inputted via the input unit 32 from the operator (Yes in step S301), the controller 100 executes stop processing for the double-action friction stir welding device 50 (step S302), to end the present program.

If the controller 100 determines that the stop command for the double-action friction stir welding device 50 has not been inputted via the input unit 32 from the operator (No in step S301), the controller 100 acquires the adhesion parameter (step S303).

Next, the controller 100 determines whether or not the adhesion parameter acquired in step S303 is equal to or greater than a first threshold (step S304). If the controller 100 determines that the adhesion parameter acquired in step S303 is not equal to or greater than the first threshold (No in step S304), the controller 100 returns to step S201.

On the other hand, if the controller 100 determines that the adhesion parameter acquired in step S303 is equal to or greater than the first threshold (Yes in step S304), the controller 100 determines whether or not the adhesion parameter acquired in step S303 is equal to or greater than a second threshold (step S305).

Here, the second threshold can be set in advance through an experiment or the like, and is set to an absolute value greater than the first threshold and smaller than the absolute value of the adhesion parameter corresponding to the breakage life of the pin member 11 and the shoulder member 12, as described later. In the case where the current value is used as the adhesion parameter, from the standpoint of suppressing breakage of the welding tool 51, the second threshold may be 5 A or 5.5 A, for example.

In the case where the number of times of friction stir welding is used as the adhesion parameter, the number of times the current value detected by the current detector 34 has become 5 A may be used, or the number of times the current value detected by the current detector 34 has become 5.5 A may be used. Similarly, in the case where stress is used as the adhesion parameter, stress detected by the stress detector when the current value detected by the current detector 34 has become 5 A may be used, or stress detected by the stress detector when the current value detected by the current detector 34 has become 5.5 A may be used.

If the controller 100 determines that the adhesion parameter acquired in step S303 is not equal to or greater than the second threshold (No in step S305), the controller 100 executes cleaning of the welding tool 51 (step S306) and returns to step S301. The controller 100 may cause the notification device 35 to output a warning, before executing cleaning of the welding tool 51.

On the other hand, if the controller 100 determines that the adhesion parameter acquired in step S303 is equal to or greater than the second threshold (Yes in step S305), the controller 100 forcibly stops the double-action friction stir welding device 50 (step S307).

Specifically, for example, the controller 100 controls the pin drive portion 531 and the shoulder drive portion 532 to move the pin member 11, the shoulder member 12, and the clamp member 54 to predetermined initial positions, and stops the rotation drive portion 533.

At this time, the controller 100 may control the pin drive portion 531 so as to reduce the pressing forces of the pin member 11 and the shoulder member 12 pressing the welding object 60, and then control the shoulder drive portion 532 so as to move the pin member 11, the shoulder member 12, and the clamp member 54 to the predetermined initial positions.

In addition, the controller 100 may control the rotation drive portion 533 so as to reduce the rotation speeds of the pin member 11 and the shoulder member 12, and then control the shoulder drive portion 532 so as to move the pin member 11, the shoulder member 12, and the clamp member 54 to the predetermined initial positions.

Further, the controller 100 may control the pin drive portion 531 so as to reduce the pressing forces of the pin member 11 and the shoulder member 12 pressing the welding object 60, and control the rotation drive portion 533 so as to reduce the rotation speeds of the pin member 11 and the shoulder member 12, and then the controller 100 may control the shoulder drive portion 532 so as to move the pin member 11, the shoulder member 12, and the clamp member 54 to the predetermined initial positions.

Next, the controller 100 prohibits execution of the next welding (step S308), and ends the present program. The controller 100 may execute cleaning of the welding tool 51 after executing the processing in step S308. In addition, after executing the processing in step S308, the controller 100 may cause the notification device 35 to give a notification that execution of the next welding is prohibited. Further, after executing the processing in step S308, the controller 100 may cause the notification device 35 to give a notification that execution of the next welding is prohibited, and then execute cleaning of the welding tool 51.

The double-action friction stir welding device 50 according to the present embodiment 10 configured as described above also provides the same effects as in the double-action friction stir welding device 50 according to any of embodiments 7 to 9.

In the double-action friction stir welding device 50 according to the present embodiment 10, the controller 100 prohibits the next welding operation for a welding object 60 when the adhesion parameter is equal to or greater than the second threshold. Thus, in a state in which the welding tool 51 is highly likely to be broken, welding operation for the welding object 60 is not executed, and therefore breakage of the welding tool 51 can be prevented.

Other Embodiments

In embodiments 1 to 4, cleaning of the clamp member 54 may be omitted. In addition, cleaning of one of the pin member 11 and the shoulder member 12 may be omitted.

In embodiments 1 to 4, warning may be performed using a message, instead of an alarm.

In embodiments 1 to 4, one of warning and prohibition of operation of the welding tool may be omitted.

From the above description, various modifications and other embodiments of the present invention are apparent to the person skilled in the art. Therefore, the above description should be interpreted as illustrative only, and is provided for the purpose of teaching the best mode for carrying out the present invention to the person skilled in the art. The details of structures and/or the functions of the present invention may be substantially modified without deviating from the scope of the present invention.

INDUSTRIAL APPLICABILITY

The method for operating a double-action friction stir welding device, and the double-action friction stir welding device, according to the present invention are useful as a method for operating a double-action friction stir welding device, and as a double-action friction stir welding device, that enable the life of a welding tool to be prolonged.

REFERENCE SIGNS LIST 11 pin member
11a lower end surface
12 shoulder member
12a lower end surface
13 central through hole
21 control unit
31 storage unit
32 input unit
33 alarm unit
34 current detector
35 notification device
41 clamp drive portion
50 double-action friction stir welding device
50A double-action friction stir welding device
50B double-action friction stir welding device
50C double-action friction stir welding device
51 welding tool
52 welding tool fixing portion
53 tool drive unit
54 clamp member
54a lower end surface
55 C-shaped frame
56 back contact member
56a support surface
60 welding object
60a plastic-flow portion
60b welded portion
60c front surface
60d back surface
61 metal plate
61A first member
61B plastic-flow portion
62 metal plate
62A second member
62B plastic-flow portion
80 rotary encoder
81 stress sensor
100 controller
521 rotary body
522 movable body
531 pin drive portion
532 shoulder drive portion
533 rotation drive portion
Xr center axis

The invention claimed is:
1. A method for operating a double-action friction stir welding device for welding an object to be welded including a first member and a second member by softening the object to be welded with frictional heat, the double-action friction stir welding device including
- a cylindrical shoulder member having a cylindrical central through hole concentrically extending at a center,
- a cylindrical pin member forming a welding tool together with the shoulder member, and fitted into the central through hole of the shoulder member concentrically with the shoulder member,
- a projection/retraction mechanism configured to cause the pin member to project/retract relative to the shoulder member,
- a rotation mechanism configured to rotate the welding tool about a center axis of the pin member, and
- an advancing/retracting mechanism configured to advance/retract the welding tool in an extending direction of the center axis of the pin member, the method comprising:
- operation (A) of performing friction stir welding for the object to be welded through rotation of the welding tool by the rotation mechanism, projection/retraction of the pin member relative to the shoulder member by the projection/retraction mechanism, and advancement/retraction of the welding tool by the advancing/retracting mechanism; and
- operation (B) of cleaning at least one of an outer circumferential surface of the pin member and an inner circumferential surface of the central through hole of the shoulder member on the basis of a level of an adhesion parameter correlated with a degree of adhesion of a material of the object to be welded, caused by the friction stir welding, on the outer circumferential surface of the pin member and the inner circumferential surface of the central through hole of the shoulder member.

2. The method for operating the double-action friction stir welding device according to claim 1, wherein
the adhesion parameter is a current value of a motor provided to the projection/retraction mechanism and configured to drive the pin member to project/retract relative to the shoulder member.

3. The method for operating the double-action friction stir welding device according to claim 1, wherein
the adhesion parameter is a number of times of friction stir welding performed for the object to be welded.

4. A method for operating a double-action friction stir welding device for welding an object to be welded including a first member and a second member by softening the object to be welded with frictional heat, the double-action friction stir welding device including
- a cylindrical shoulder member having a cylindrical central through hole concentrically extending at a center,
- a cylindrical pin member forming a welding tool together with the shoulder member, and fitted into the central through hole of the shoulder member concentrically with the shoulder member,
- a projection/retraction mechanism configured to cause the pin member to project/retract relative to the shoulder member,
- a rotation mechanism configured to rotate the welding tool about a center axis of the pin member, and
- an advancing/retracting mechanism configured to advance/retract the welding tool in an extending direction of the center axis of the pin member, the method comprising:
- operation (A) of performing friction stir welding for the first member and the second member placed in contact with each other, through rotation of the welding tool by the rotation mechanism, projection/retraction of the pin member relative to the shoulder member by the projection/retraction mechanism, and advancement/retraction of the welding tool by the advancing/retracting mechanism; and
- operation (E) of cleaning at least one of an outer circumferential surface of the pin member and an inner circumferential surface of the central through hole of the shoulder member at a predetermined timing.

5. The method for operating the double-action friction stir welding device according to claim 1, wherein
the first member is placed so as to be opposed to the welding tool, and is made of a material different from the second member, and
the operation (A) includes
- operation (A1) of operating the rotation mechanism and the advancing/retracting mechanism so as to cause the welding tool to press a welding target portion of the object to be welded while rotating the welding tool,
- operation (A2) of operating the projection/retraction mechanism so as to cause a head end of the welding tool to reach a predetermined first position so that the second member of the softened object to be welded is thrusted into the first member of the softened objected to be welded, and
- operation (A3) of operating the projection/retraction mechanism, the rotation mechanism, and the advancing/retracting mechanism so as to pull out the welding tool from the welding target portion while rotating the welding tool.

6. The method for operating the double-action friction stir welding device according to claim 5, wherein
in the operation (A2), operation (A21) of operating the projection/retraction mechanism so as to retract the pin member into the shoulder member so that a head end of the shoulder member reaches the first position, is executed, and after the operation (A21), operation (A22) of operating the projection/retraction mechanism so as to retract the head end of the shoulder member from the first position and cause the pin member to project from the head end of the shoulder member, is executed.

7. The method for operating the double-action friction stir welding device according to claim 5, wherein
in the operation (A2), operation (A23) of operating the projection/retraction mechanism so as to cause the pin member to project from a head end of the shoulder member so that a head end of the pin member reaches the first position, is executed, and after the operation (A23), operation (A24) of operating the projection/retraction mechanism so as to retract the head end of the pin member into the shoulder member from the first position, is executed.

8. A double-action friction stir welding device for welding an object to be welded including a first member and a second member by softening the object to be welded with frictional heat, the double-action friction stir welding device comprising:
- a cylindrical shoulder member having a cylindrical central through hole concentrically extending at a center;
- a cylindrical pin member forming a welding tool together with the shoulder member, and fitted into the central through hole of the shoulder member concentrically with the shoulder member;

a projection/retraction mechanism configured to cause the pin member to project/retract relative to the shoulder member;
a rotation mechanism configured to rotate the welding tool about a center axis of the pin member;
an advancing/retracting mechanism configured to advance/retract the welding tool in an extending direction of the center axis of the pin member; and
a controller, wherein
the controller executes
operation (A) of performing friction stir welding for the object to be welded through rotation of the welding tool by control of the rotation mechanism, projection/retraction of the pin member relative to the shoulder member by control of the projection/retraction mechanism, and advancement/retraction of the welding tool by control of the advancing/retracting mechanism, and
operation (B1) of performing at least one of warning, prohibition of operation of the welding tool, and cleaning of the welding tool on the basis of a level of an adhesion parameter correlated with a degree of adhesion of a material of the object to be welded, caused by the friction stir welding, on an outer circumferential surface of the pin member and an inner circumferential surface of the central through hole of the shoulder member.

9. The double-action friction stir welding device according to claim 8, wherein
the adhesion parameter is a parameter having an absolute value that increases with increase in an amount of the adhesion, and a first threshold is set for the absolute value of the adhesion parameter.

10. The double-action friction stir welding device according to claim 9, wherein
in the operation (B1), the controller performs the warning when the adhesion parameter is equal to or greater than the first threshold.

11. The double-action friction stir welding device according to claim 10, wherein
in the operation (B1), the controller performs prohibition of operation of the welding tool when the adhesion parameter is equal to or greater than a second threshold greater than the first threshold.

12. The double-action friction stir welding device according to claim 8, wherein
the adhesion parameter is a parameter having an absolute value that increases with increase in an amount of the adhesion, and
in the operation (B1), the controller performs at least one of warning and prohibition of operation of the welding tool when an amount of increase in the adhesion parameter per predetermined period is equal to or great than a predetermined value.

13. The double-action friction stir welding device according to claim 8, wherein
the adhesion parameter is a current value of a motor provided to the projection/retraction mechanism and configured to drive the pin member to project/retract relative to the shoulder member.

14. The double-action friction stir welding device according to claim 8, wherein
the adhesion parameter is a number of times of friction stir welding performed for the object to be welded.

15. The double-action friction stir welding device according to claim 8, wherein the adhesion parameter is stress occurring in the pin member or the shoulder member.

16. A double-action friction stir welding device for welding an object to be welded including a first member and a second member by softening the object to be welded with frictional heat, the double-action friction stir welding device comprising:
a cylindrical shoulder member having a cylindrical central through hole concentrically extending at a center;
a cylindrical pin member forming a welding tool together with the shoulder member, and fitted into the central through hole of the shoulder member concentrically with the shoulder member;
a projection/retraction mechanism configured to cause the pin member to project/retract relative to the shoulder member;
a rotation mechanism configured to rotate the welding tool about a center axis of the pin member;
an advancing/retracting mechanism configured to advance/retract the welding tool in an extending direction of the center axis of the pin member; and
a controller, wherein
the controller executes
operation (A) of performing friction stir welding for the first member and second member placed in contact with each other, through rotation of the welding tool by the rotation mechanism, projection/retraction of the pin member relative to the shoulder member by the projection/retraction mechanism, and advancement/retraction of the welding tool by the advancing/retracting mechanism, and
operation (E) of performing at least one of warning, prohibition of operation of the welding tool, and cleaning of the welding tool at a predetermined timing.

17. The double-action friction stir welding device according to claim 8, wherein
the first member is placed so as to be opposed to the welding tool, and is made of a material different from the second member, and
in the operation (A), the controller executes
operation (A1) of operating the rotation mechanism and the advancing/retracting mechanism so as to cause the welding tool to press a welding target portion of the object to be welded while rotating the welding tool,
operation (A2) of operating the projection/retraction mechanism so as to cause a head end of the welding tool to reach a predetermined first position so that the second member of the softened object to be welded is thrusted into the first member of the softened objected to be welded, and
operation (A3) of operating the projection/retraction mechanism, the rotation mechanism, and the advancing/retracting mechanism so as to pull out the welding tool from the welding target portion while rotating the welding tool.

18. The double-action friction stir welding device according to claim 17, wherein
in the operation (A2), the controller executes operation (A21) of operating the projection/retraction mechanism so as to retract the pin member into the shoulder member so that a head end of the shoulder member reaches the first position, and after the operation (A21), executes operation (A22) of operating the projection/retraction mechanism so as to retract the head end of the shoulder member from the first position and cause the pin member to project from the head end of the shoulder member.

19. The double-action friction stir welding device according to claim 17, wherein in the operation (A2), the controller executes operation (A23) of operating the projection/retraction mechanism so as to cause the pin member to project from a head end of the shoulder member so that a head end of the pin member reaches the first position, and after the operation (A23), executes operation (A24) of operating the projection/retraction mechanism so as to retract the head end of the pin member into the shoulder member from the first position.

20. The double-action friction stir welding device according to claim 17, wherein the first member is made of a material having a lower softening temperature than that of the second member.

* * * * *